United States Patent
Keslin et al.

(10) Patent No.: US 11,423,218 B2
(45) Date of Patent: Aug. 23, 2022

(54) ABSTRACTION OF FORMULAS INTO REUSABLE FUNCTIONS

(71) Applicant: Microsoft Technology Licensing, LLC, Redmond, WA (US)

(72) Inventors: Michelle Elena Keslin, Kirkland, WA (US); Christopher John Gross, Seattle, WA (US); Joseph Mcdaid, Seattle, WA (US); Andrew James Becker, Saxapahaw, NC (US); Su-Piao Bill Wu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/118,187

(22) Filed: Dec. 10, 2020

(65) Prior Publication Data

US 2022/0188505 A1    Jun. 16, 2022

(51) Int. Cl.
  *G06F 40/00* (2020.01)
  *G06F 40/18* (2020.01)
  *G06F 16/93* (2019.01)
  *G06F 40/103* (2020.01)

(52) U.S. Cl.
  CPC .............. *G06F 40/18* (2020.01); *G06F 16/93* (2019.01); *G06F 40/103* (2020.01)

(58) Field of Classification Search
  CPC ................................ G06F 40/18; G06F 40/103
  See application file for complete search history.

(56) References Cited

U.S. PATENT DOCUMENTS

| | | | |
|---|---|---|---|
| 9,389,891 B2 | 7/2016 | Battagin et al. | |
| 10,789,378 B1* | 9/2020 | Karpel | G06F 3/04842 |
| 2004/0103366 A1* | 5/2004 | Peyton-Jones | G06F 40/18 715/213 |
| 2006/0069696 A1* | 3/2006 | Becker | G06F 40/18 |
| 2007/0219956 A1* | 9/2007 | Milton | G06F 40/18 |
| 2009/0172063 A1 | 7/2009 | Chirilov et al. | |
| 2009/0271693 A1 | 10/2009 | Rae et al. | |

OTHER PUBLICATIONS

"Build Cross-Platform Desktop Apps with JavaScript, HTML, and CSS", Retrieved From: https://web.archive.org/web/20201013044100/https://www.electronjs.org/, Retrieved Date: Oct. 13, 2020, 3 Pages.
Avedon, et al., "Microsoft Defender Application Guard Overview", Retrieved From: https://docs.microsoft.com/en-us/windows/security/threat-protection/microsoft-defender-application-guard/md-app-guard-overview, Sep. 7, 2020, 3 Pages.
"International Search Report and Written Opinion Issued in PCT Application No. PCT/US21/060417", dated Mar. 10, 2022, 9 Pages.

* cited by examiner

*Primary Examiner* — Scott T Baderman
*Assistant Examiner* — Barbara M Level
(74) *Attorney, Agent, or Firm* — Schwegman Lundberg & Woessner, P.A.

(57) ABSTRACT

A formula abstraction system is described. The system includes detecting a user-generated formula in a cell of a spreadsheet document, generating a graphical user interface that queries entries of a custom function based on the user-generated formula, forming the custom function by abstracting the user-generated formula to the custom function based on the entries, and storing the custom function in a function library of the spreadsheet document. The custom function applies the user-generated formula in a user-selected cell of the spreadsheet document.

20 Claims, 19 Drawing Sheets

ABSTRACTION OF FORMULAS INTO REUSABLE FUNCTIONS

TECHNICAL FIELD

The subject matter disclosed herein generally relates to a special-purpose machine that abstracts a user-generated formula into a reusable function in a spreadsheet application, including computerized variants of such special-purpose machines and improvements to such variants. Specifically, the present disclosure addresses systems and methods for reusing a custom function in a spreadsheet application.

BACKGROUND

A spreadsheet application usually refers to a computer application for organization, analysis and storage of data in tabular form. The computer application operates on data entered in cells of a table. Each cell may contain numeric data, text data, or a formula. The result of the formula is automatically calculated. The value of the result can be based on the contents of other cells.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 is a screenshot illustrating an aspect of the subject matter in accordance with one example embodiment.

FIG. 14 is a screenshot illustrating an aspect of the subject matter in accordance with one example embodiment.

DETAILED DESCRIPTION

Figure 1:
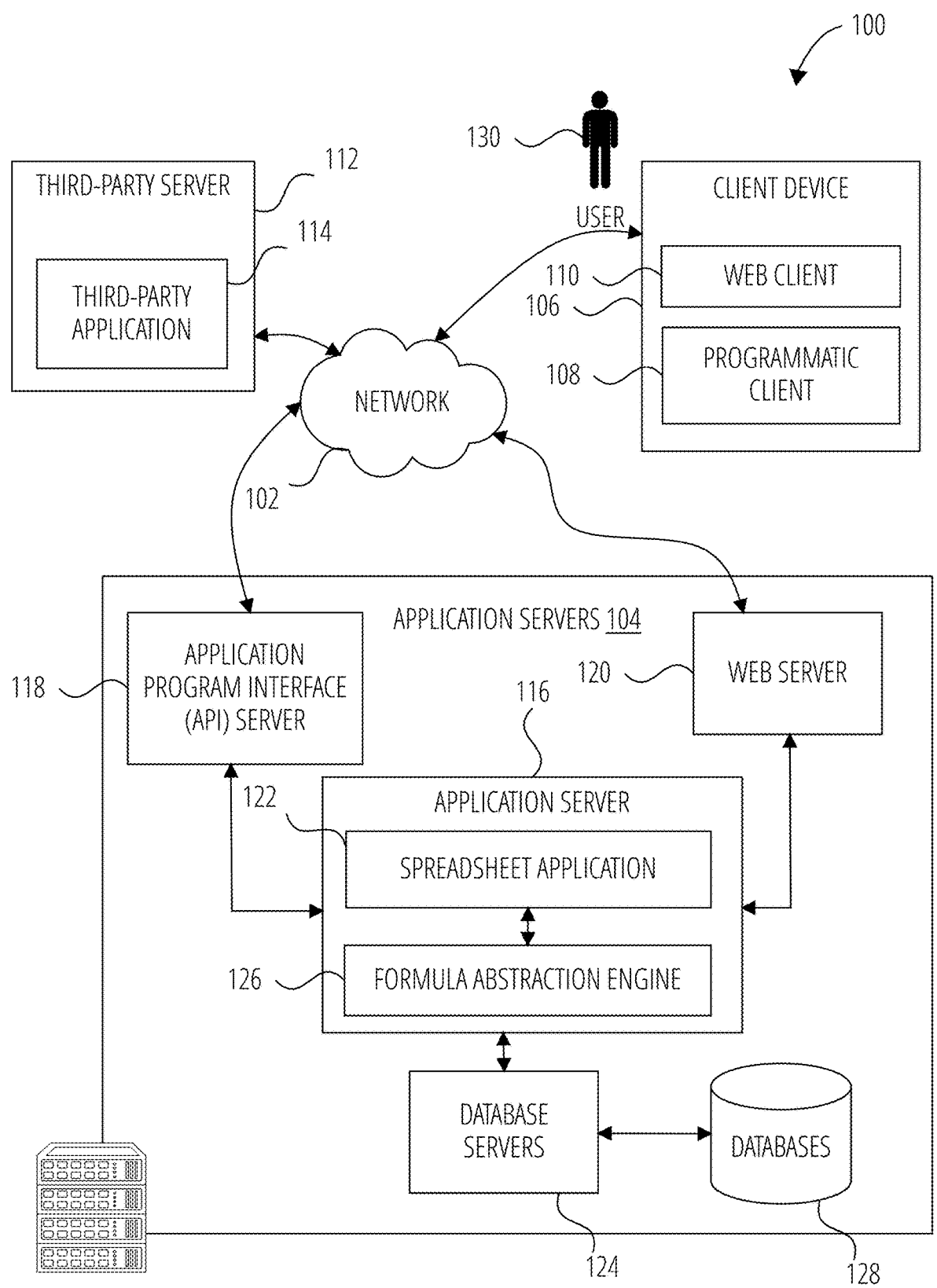
FIG. 1 is a diagrammatic representation of a networked environment in which the present disclosure is deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "spreadsheet application" is used herein to refer to a computer application for organization, analysis and storage of data in tabular form. The computer application operates on data entered in cells of a table. Each cell may contain numeric data, text data, or a formula. The result of the formula is automatically calculated. The value of the result can be based on the contents of other cells.

The term "spreadsheet document" is used herein to refer to an electronic document generated by the spreadsheet application. Users of the spreadsheet document can adjust any stored value and observe the effects on the calculated values.

Spreadsheet application can perform basic arithmetic and mathematical functions. Additional predefined functions (e.g., non-user defined functions) can be pre-installed on the spreadsheet application. Examples of predefined functions include common financial and statistical operations. However, common spreadsheet applications do not provide the ability for the user to easily define or customize a function that can be reused across different spreadsheet documents or across different users of the spreadsheet application.

Furthermore, it is common for spreadsheet application users to reuse a single formula multiple times throughout the spreadsheet document. Typically, this reuse is accomplished through copy/paste or other means (that are prone to errors). The present application describes a system that abstracts the formula into a reusable function in a user-friendly operation.

In one example embodiment, the present application describes a system that detects a user of the spreadsheet entering a formula in a cell. The system abstracts the formula based on the variables used in the formula by detecting which elements in the formula are likely to represent function arguments, and then turning the structure of the formula into a function logic (custom function). The formula includes, for example, logic or operators that perform operations on the value from other cells in the spreadsheet document. The user can thus create the custom function (without advanced programming) and reuse the custom function in the spreadsheet document/spreadsheet application.

Custom functions can be written using a variety of programming tools. However, such process is complex and requires advanced programming knowledge. The present application enables the user of the spreadsheet application to write a familiar and user-friendly spreadsheet formula. The presently described system allows for a one-click conversion into a custom, reusable function.

In one example embodiment, a formula abstraction system is described. The system includes detecting a user-generated formula in a cell of a spreadsheet document, generating a graphical user interface that queries entries of a custom function based on the user-generated formula, forming the custom function by abstracting the user-generated formula to the custom function based on the entries, and storing the custom function in a function library of the spreadsheet document. The custom function applies the user-generated formula in a user-selected cell of the spreadsheet document.

As a result, one or more of the methodologies described herein facilitate solving the technical problem of advanced customization of functions in spreadsheet applications. As such, one or more of the methodologies described herein may obviate a need for certain efforts or computing resources that otherwise would be involved in providing complex and resource-intensive tools to generate custom functions. As a result, resources used by one or more machines, databases, or devices (e.g., within the environment) may be reduced. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser operating a web version of an enterprise application), a programmatic client 108 (e.g., a client-side enterprise document application such as Microsoft Excel™) that is hosted and executed on the client device 106. In one example embodiment, the web client 110 and the programmatic client 108 include a formula abstraction feature that detects a user-generated custom formula and abstract the custom formula into a custom function for reuse. The formula abstraction feature may be part of the programmatic client 108. In another example, the formula abstraction feature is provided remotely from the application servers 104.

An Application Program Interface (API) server 118 and a web server 120 provide respective programmatic and web interfaces to application servers 104. A specific application server 116 hosts a spreadsheet application 122 and a formula abstraction engine 126. Both the spreadsheet application 122 and the formula abstraction engine 126 include corresponding components, modules and/or applications.

The spreadsheet application 122 includes a spreadsheet document authoring/editing application (e.g., Microsoft Excel™) that enables the user 130 to create, edit, and view spreadsheet documents. In another example, the spreadsheet application 122 also includes a collaborative application that enables peer enterprise users to collaborate on a shared spreadsheet document. For example, the client device 106 may access the spreadsheet application 122 to view and edit a document that is shared with other peer users. The spreadsheet application 122 communicates with the programmatic client 108 on the client device 106. For example, the programmatic client 108 checks in with the spreadsheet application 122 and verifies a validity of a license or version of the programmatic client 108 on the client device 106. In another example embodiment, the programmatic client 108 includes other applications such as a content creation application, a collaborative application, and a shared storage application.

The formula abstraction engine 126 accesses a spreadsheet document from the spreadsheet application 122, the web client 110, or the programmatic client 108. The operations described below with respect to the formula abstraction engine 126 may be performed at the application server 116, the web client 110, or at the programmatic client 108.

The formula abstraction engine 126 detects a user-generated formula in a cell of the spreadsheet document. For example, the user-generated formula includes logic operations between values and variables (e.g., 2+3*B1) where B1 represent a value at the cell B1. In one example embodiment, the formula abstraction engine 126 detects an event (or a series of event) that indicates that the user is about to reuse the user-generated formula. For example, the formula abstraction engine 126 detects the following events: the user has entered a user-generated formula in a first cell; the user has copied the content of the first cell; and the user has selected a second cell (e.g., a blank cell). In response to the above events, the formula abstraction engine 126 causes a graphical user interface (GUI) to pop up and request entries from the user 130. For example, the GUI may include a query box that requests the user 130 to enter a name for the function, to identify an argument (e.g., temp) in the custom formula, and to update the logic of the custom formula with the argument (e.g., "2+3*temp" instead of "2+3*B1"). The formula abstraction engine 126 generates a custom function by abstracting the entries in the query box. The custom function can be reused by the user in other cells of the spreadsheet document by identifying the name of the custom function in a cell.

In another example embodiment, the formula abstraction engine 126 saves the custom function in a function library of the spreadsheet application 122. In another example embodiment, the formula abstraction engine 126 saves the custom function in the spreadsheet document. As such, the user 130 can share the custom function by sending the spreadsheet document to another user.

In one example embodiment, the web client 110 communicates with the formula abstraction engine 126 and spreadsheet application 122 via the programmatic interface provided by the Application Program Interface (API) server 118. In another example embodiment, the formula abstraction engine 126 modifies spreadsheet documents (e.g., modify lambda functions in the spreadsheet document) and provides the modified spreadsheet document to the spreadsheet application 122 or the client device 106. The spreadsheet application 122 or the programmatic client 108 renders a display of the modified document in a user interface of the spreadsheet application 122 or programmatic client 108. For example, the spreadsheet application 122 generates a list of custom functions provided by the modified spreadsheet document.

The application server 116 is shown to be communicatively coupled to database servers 124 that facilitates access to an information storage repository or databases 128. In one example embodiment, the databases 128 includes storage devices that store documents to be processed by the spreadsheet application 122. For example, the databases 128 include a library of spreadsheet documents, a library of predefined/common functions, and a library of custom functions (e.g., created by one or more users of the spreadsheet application 122).

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. For example, the third-party application 114 retrieves a spreadsheet document and provides the spreadsheet document to the formula abstraction engine 126. The formula abstraction engine 126 modifies the spreadsheet document and provides the modified spreadsheet document to the client device 106.

Figure 2:
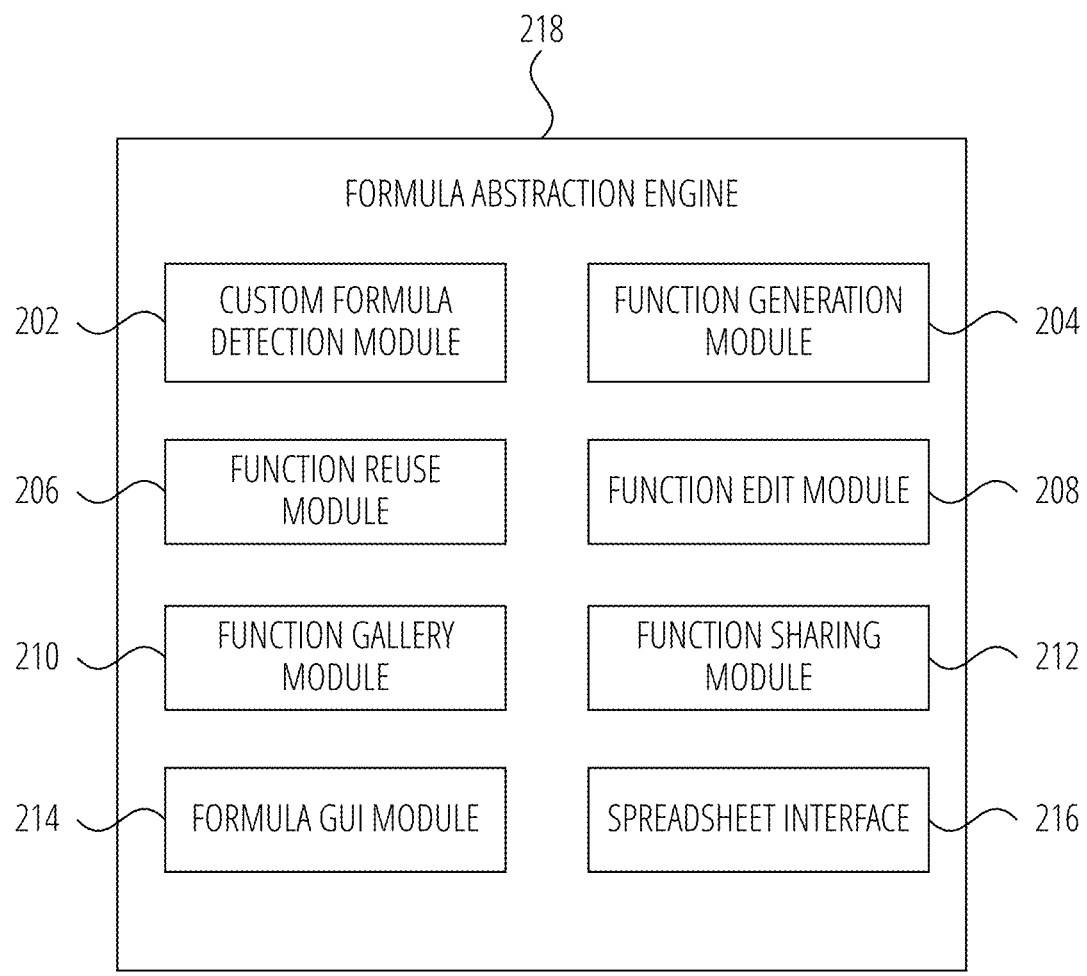
FIG. 2 is a block diagram illustrating a formula abstraction engine in accordance with one example embodiment.

FIG. 2 is a block diagram illustrating a formula abstraction engine 218 in accordance with one example embodiment. The formula abstraction engine 218 comprises a custom formula detection module 202, a function generation module 204, a function reuse module 206, a function edit module 208, a function gallery module 210, a function sharing module 212, a formula GUI module 214, a spreadsheet interface 216, and a formula abstraction engine 218.

The custom formula detection module 202 detects that an entry provided by the user 130 in a cell of the spreadsheet document includes a custom formula. In one example, the custom formula detection module 202 detects for the presence of operator logic, values, and references to other cells in the spreadsheet document. For example, the custom formula detection module 202 detects that entry in the cell includes a formula such as "=(5/9)*(B2−32)". In another example, the custom formula detection module 202 detects the presence of other (pre-installed/pre-defined functions and custom functions) functions such "=5*sum(B1−B5)." One of ordinary skill in the art will appreciate that other means of formula detection in a cell can be achieved.

The function generation module 204 abstracts the custom formula based on arguments defined or detected by the function generation module 204. For example, the function generation module 204 determines that the variable "B2", used in a formula inside a first cell, is a non-absolute variable that corresponds to a value in the cell located at B2. Because the variable is not absolute, the custom formula will use a variable that changes based on its relative cell location. For example, the function generation module 204 updates the formula inside a second cell to include the variable "B3" based on the relative location between the first cell and the second cell.

In one example embodiment, the function generation module 204 abstracts the custom formula by replacing the variable with an argument label that is more meaningful to the user 130. For example, values in cells B2 and B3 indicate a temperature variable or a zip code variable. In that case, the function generation module 204 abstracts the user-generated custom formula with the argument label corresponding to the values in cells B2 and B3. For example, the function generation module 204 transforms the custom formula from "2+3*B2" to "2+3*temp" or "zip+1" where the argument labels "temp" or "zip" represents values of cells B2 and B3.

In another example embodiment, the function generation module 204 identifies a header name corresponding to the cells B2 and B3 and applies the header name to the argument label. For example, if the header of B2 and B3 is "zipcode", the argument label for values from B2 and B3 is "zipcode." In another example, the user 130 manually names the argument label and provides the manually named argument label to the function generation module 204 via a graphical user interface.

In another example embodiment, the function generation module 204 enables the user 130 to name the custom function based on the abstracted custom formula (also referred to as custom function). For example, the function generation module 204 may name the custom function to "functionA" and apply/reuse the custom function in any other cell of the spreadsheet document.

The function reuse module 206 detects that the user 130 is attempting to reuse a custom formula. In one example embodiment, the function reuse module 206 detects an event (or a series of event) that indicates that the user is about to reuse the user-generated formula. For example, the formula abstraction engine 126 detects the following events: the user has entered a user-generated formula in a first cell; the user has copied the content of the first cell; and the user has selected a second cell (e.g., a blank cell). In response, the function reuse module 206 generates a graphical user interface (GUI) using the formula GUI module 214.

In another example embodiment, the function reuse module 206 detects that the user 130 has selected (e.g., by moving a GUI element such as a pointer) a second cell in the spreadsheet application. The function reuse module 206 identifies that a first cell (adjacent to the second cell) includes a custom function (defined using the function generation module 204). The function reuse module 206 generates a recommendation to reuse/apply the custom function of the first cell in the second cell. For example, the function reuse module 206 generates a pop up box that includes the custom function.

In another example embodiment, the function reuse module 206 automatically populates argument of the custom function in the second cell based on a location of the second cell relative to the first cell (e.g., "=customfunction(argument value)"). In another example embodiment, the function reuse module 206 queries the argument value from the user 130.

The function edit module 208 enables any user of the spreadsheet document to edit the custom formula by renaming the custom function name, modifying the label argument, modifying the custom formula. For example, a user modifies the custom formula or logic of the custom function. In response to the modified custom formula, the formula abstraction engine 126 automatically updates and recalculates the values in the cells that include the custom function based on the updated/modified custom formula.

The function gallery module 210 saves the custom function in a library of functions associated with the spreadsheet document or the spreadsheet application 122. For example, the library of functions includes custom functions (that are generated by the user 130 and/or other users of the spreadsheet application 122) and predefined/standard functions (e.g., sum function) that are pre-installed in the spreadsheet application 122). In one example, the function gallery module 210 saves the custom function only for a specific user of the spreadsheet application 122. Only the specific user has access to the custom functions. In another example, the function gallery module 210 saves the custom function in the spreadsheet document. As such, any user having access to the spreadsheet document, also has access to the custom function. In another example, the function gallery module 210 saves the custom function in a gallery of functions that can only be accessed by authorized users (e.g., users of an enterprise, users of a group in the enterprise).

The function sharing module 212 shares the custom function by embedding features of the custom function in the spreadsheet document and sharing the spreadsheet document. As such, a second user that receives the spreadsheet document from a first user also has access to the custom function in the shared spreadsheet document. In another example, the first user sends a template document or a message to the second user. The template document and the message include the custom function. The second user opens the template document with the spreadsheet application to load the shared custom function at the spreadsheet application operated by the second user.

The formula GUI module 214 generates a graphical user interface (GUI) that provides formula information to the user 130. For example, the GUI includes a pop-up dialog box that includes a name entry box, an argument entry box, and a formula entry box. The formula GUI module 214 receives populated values in the entry boxes from the user 130 and communicates the values to the function generation module 204. In another example, the formula GUI module 214 updates the formula in the formula entry box based on the entry in the argument box.

The spreadsheet interface 216 communicates with the spreadsheet application 122 to access the values in the spreadsheet document. The spreadsheet interface 216 also provides the custom function to the spreadsheet application 122.

Figure 3:
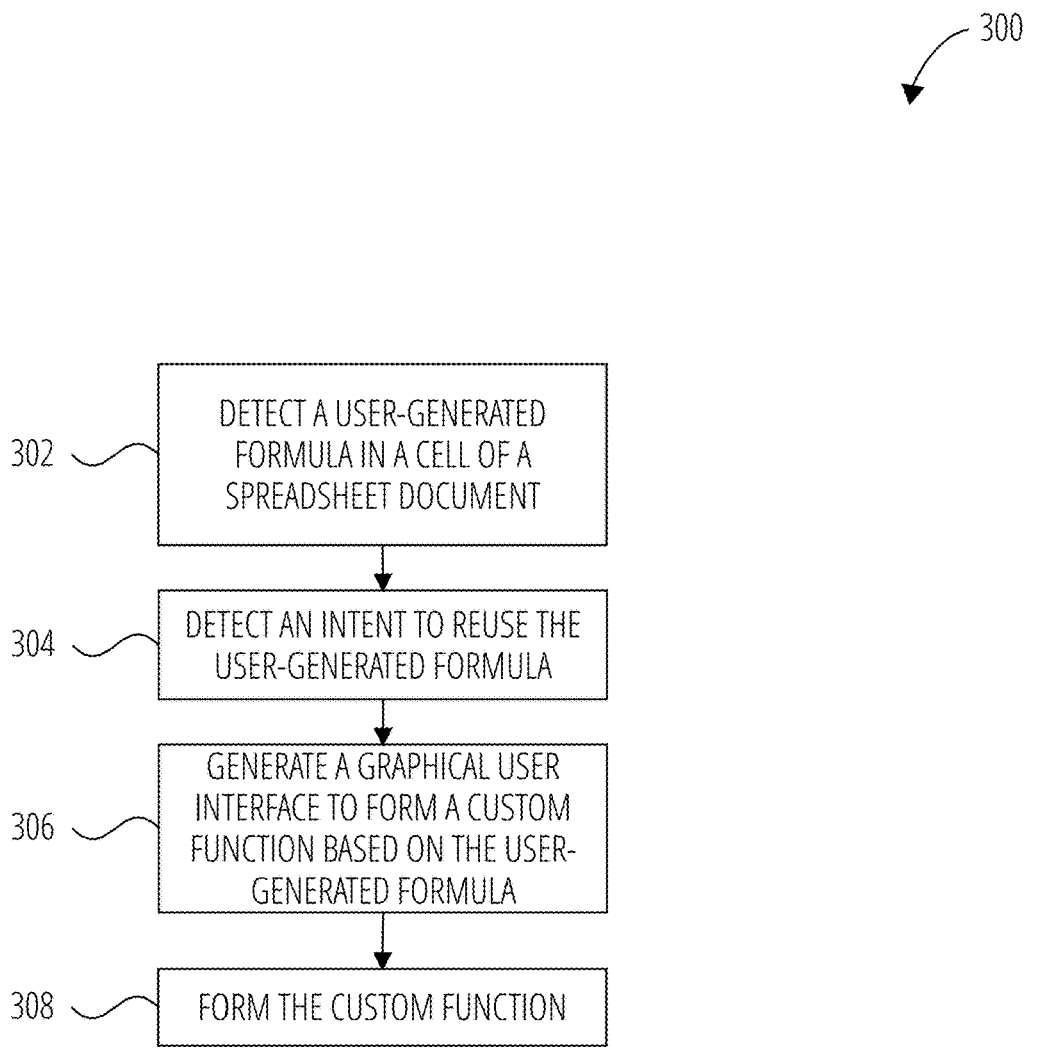
FIG. 3 is a flow diagram illustrating a method for forming a custom function using the formula abstraction engine in accordance with one example embodiment.

FIG. 3 is a flow diagram illustrating a method for operating the formula abstraction engine 218 in accordance with one example embodiment. The method 300 may be performed by one or more computational devices, as described below. Operations in the method 300 may be performed by the formula abstraction engine 218, using components (e.g., modules, engines) described above with respect to FIG. 2. Accordingly, the method 300 is described by way of example with reference to the formula abstraction engine 218. However, it shall be appreciated that at least some of the operations of the method 300 may be deployed on various other hardware configurations or be performed by similar components residing elsewhere. For example, some of the operations may be performed at the third-party server 112.

In block 302, the formula abstraction engine 218 detects a user-generated formula in a cell of a spreadsheet document. In one example embodiment, the custom formula detection module 202 performs the operation of block 302.

In block 304, the formula abstraction engine 218 detects an intent to reuse the user-generated formula. In one example embodiment, the function reuse module 206 performs the operation of block 304.

In block 306, the formula abstraction engine 218 generates a graphical user interface to form a custom function based on the user-generated formula. In one example embodiment, the formula GUI module 214 performs the operation of block 306.

In block 308, the formula abstraction engine 218 forms the custom function. In one example embodiment, the function generation module 204 performs the operation of block 308.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 4:
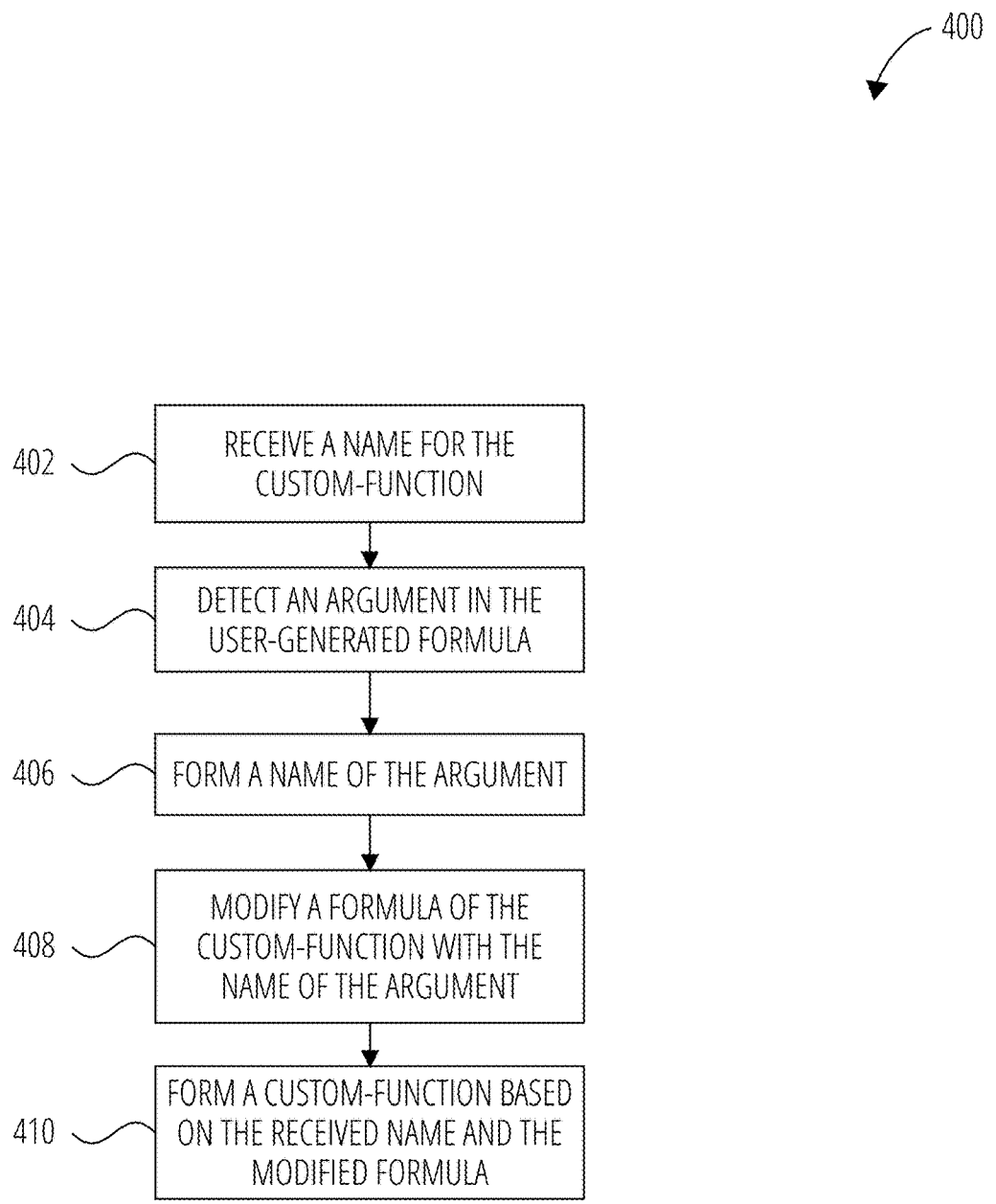
FIG. 4 is a flow diagram illustrating a method for forming a custom function using the formula abstraction engine in accordance with another example embodiment.

FIG. 4 is a flow diagram illustrating a method for operating the formula abstraction engine 218 in accordance with one example embodiment. The method 400 may be performed by one or more computational devices, as described below. Operations in the method 400 may be performed by the formula abstraction engine 218, using components (e.g., modules, engines) described above with respect to FIG. 2. Accordingly, the method 400 is described by way of example with reference to the formula abstraction engine 218. However, it shall be appreciated that at least some of the operations of the method 400 may be deployed on various other hardware configurations or be performed by similar components residing elsewhere. For example, some of the operations may be performed at the third-party server 112.

In block 402, the formula abstraction engine 218 receives a name for the custom-function. In one example embodiment, the function generation module 204 performs the operation of block 402.

In block 404, the formula abstraction engine 218 detects an argument in the user-generated formula. In one example embodiment, the function generation module 204 performs the operation of block 402.

In block 406, the formula abstraction engine 218 forms a name of the argument. In one example embodiment, the function generation module 204 performs the operation of block 406.

In block 408, the formula abstraction engine 218 modifies a formula of the custom-function with the name of the argument. In one example embodiment, the function generation module 204 performs the operation of block 408.

In block 410, the formula abstraction engine 218 forms a custom-function based on the received name and the modified formula. In one example embodiment, the function generation module 204 performs the operation of block 410.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 5:
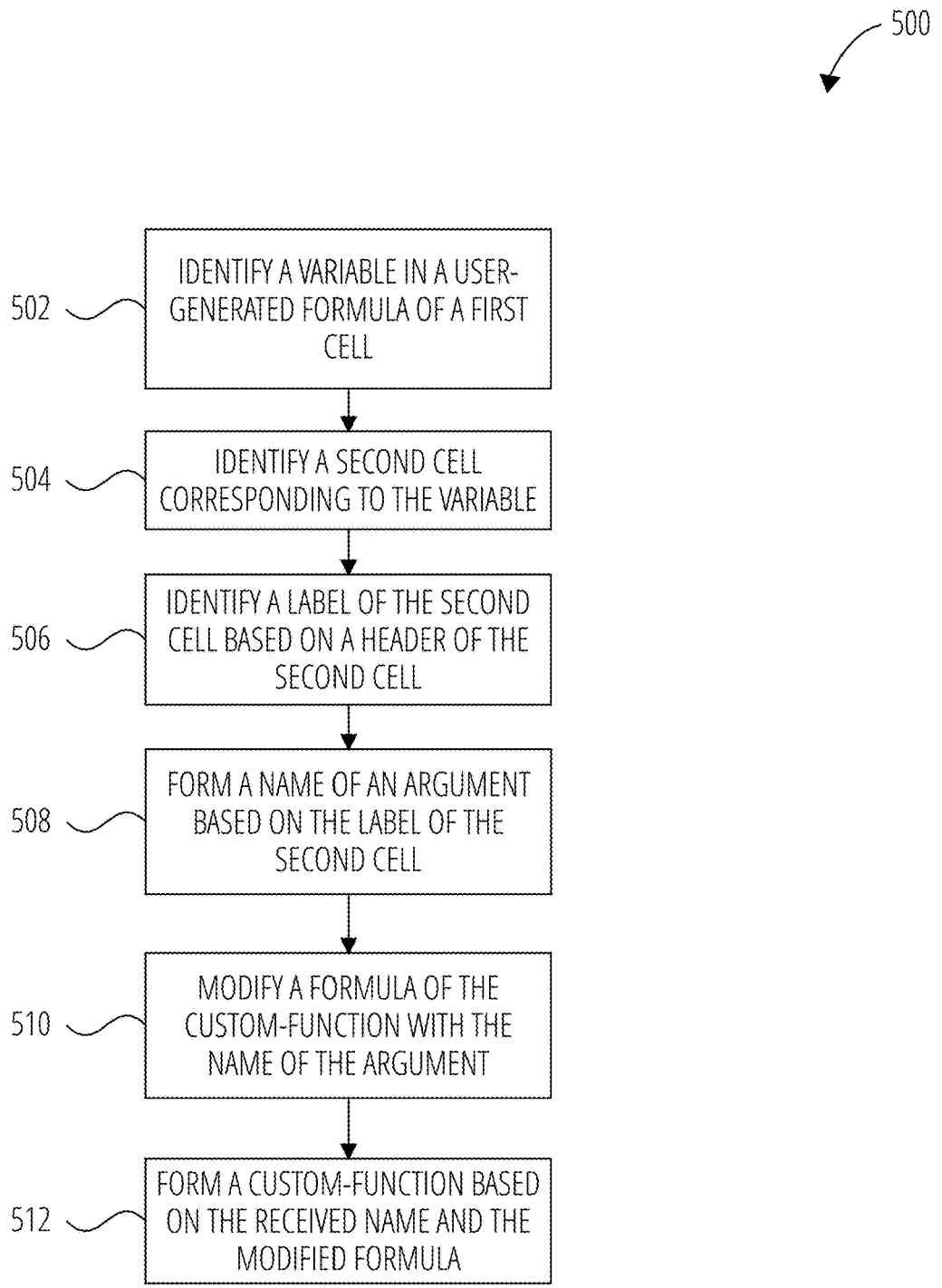
FIG. 5 is a flow diagram illustrating a method for forming a custom function using the formula abstraction engine in accordance with another example embodiment.

FIG. 5 is a flow diagram illustrating a method for operating the formula abstraction engine 218 in accordance with one example embodiment. The method 500 may be performed by one or more computational devices, as described below. Operations in the method 500 may be performed by the formula abstraction engine 218, using components (e.g., modules, engines) described above with respect to FIG. 2. Accordingly, the method 500 is described by way of example with reference to the formula abstraction engine 218. However, it shall be appreciated that at least some of the operations of the method 500 may be deployed on various other hardware configurations or be performed by similar components residing elsewhere. For example, some of the operations may be performed at the third-party server 112.

In block 502, the formula abstraction engine 218 identifies a variable in a user-generated formula of a first cell. In one example embodiment, the function generation module 204 performs the operation of block 502.

In block 504, the formula abstraction engine 218 identifies a second cell corresponding to the variable. In one example embodiment, the function generation module 204 performs the operation of block 504.

In block 506, the formula abstraction engine 218 identifies a label of the second cell based on a header of the second cell. In one example embodiment, the function generation module 204 performs the operation of block 506.

In block 508, the formula abstraction engine 218 forms a name of an argument based on the label of the second cell. In one example embodiment, the function generation module 204 performs the operation of block 508.

In block 510, the formula abstraction engine 218 modifies a formula of the custom-function with the name of the argument. In one example embodiment, the function generation module 204 performs the operation of block 510.

In block 512, the formula abstraction engine 218 forms a custom-function based on the received name and the modified formula. In one example embodiment, the function generation module 204 performs the operation of block 512.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
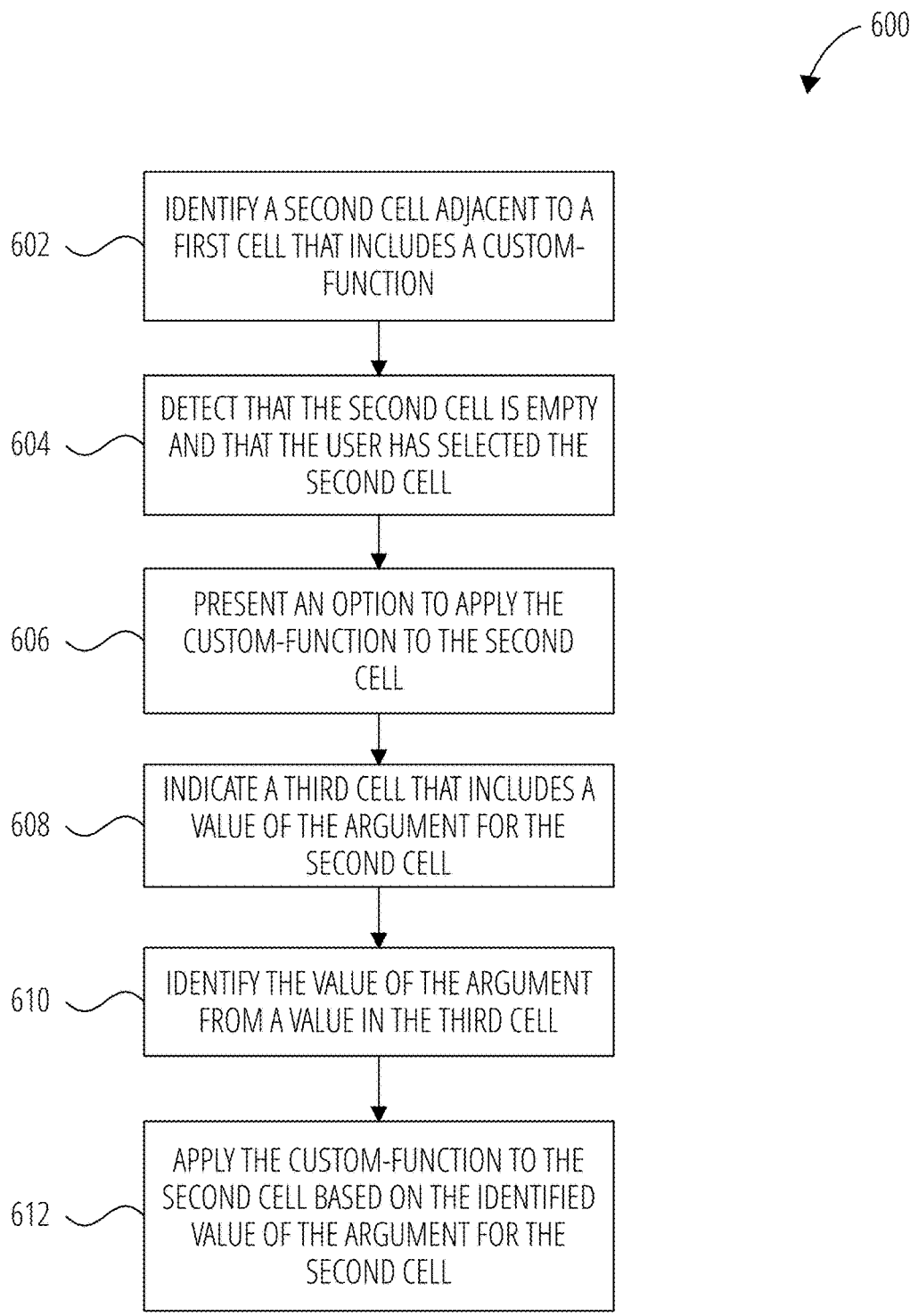
FIG. 6 is a flow diagram illustrating a method for operating the formula abstraction engine in accordance with one example embodiment.

FIG. 6 is a flow diagram illustrating a method for operating the formula abstraction engine 218 in accordance with one example embodiment. The method 600 may be performed by one or more computational devices, as described below. Operations in the method 600 may be performed by the formula abstraction engine 218, using components (e.g., modules, engines) described above with respect to FIG. 2. Accordingly, the method 600 is described by way of example with reference to the formula abstraction engine 218. However, it shall be appreciated that at least some of the operations of the method 600 may be deployed on various other hardware configurations or be performed by similar components residing elsewhere. For example, some of the operations may be performed at the third-party server 112.

In block 602, the formula abstraction engine 218 identifies a second cell adjacent to a first cell that includes a custom-function. In one example embodiment, the function reuse module 206 performs the operation of block 602.

In block 604, the formula abstraction engine 218 detects that the second cell is empty and that the user has selected the second cell. In one example embodiment, the function reuse module 206 performs the operation of block 604.

In block 606, the formula abstraction engine 218 presents an option to apply the custom-function to the second cell. In one example embodiment, the function reuse module 206 performs the operation of block 606.

In block 608, the formula abstraction engine 218 indicates a third cell that includes a value of the argument for the second cell. In one example embodiment, the function reuse module 206 performs the operation of block 608.

In block 610, the formula abstraction engine 218 identifies the value of the argument from a value in the third cell. In one example embodiment, the function reuse module 206 performs the operation of block 610.

In block 612, the formula abstraction engine 218 applies the custom-function to the second cell based on the identified value of the argument for the second cell. In one example embodiment, the function reuse module 206 performs the operation of block 612.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
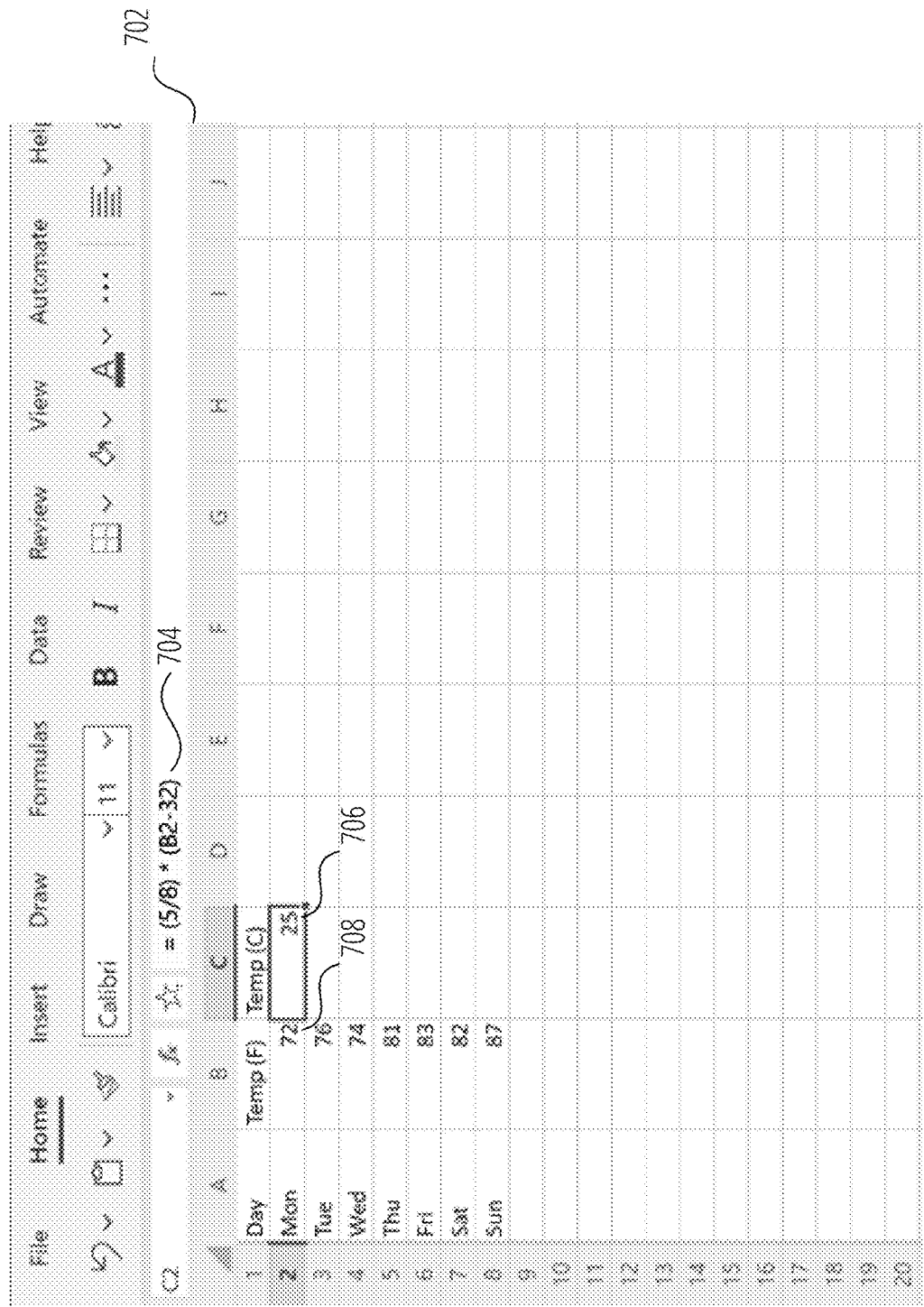
FIG. 7 is a screenshot illustrating an aspect of the subject matter in accordance with one example embodiment.

FIG. 7 is a screenshot 702 illustrating an aspect of the subject matter in accordance with one example embodiment. The screenshot 702 illustrates a spreadsheet document. The spreadsheet application 122 receives a user-generated custom formula (e.g., formula 704) for the cell 706 from the user 130 and calculates a computed value for cell 706 based on the cell 708 identified in the custom formula (e.g., B2). The computed value for cell 706 is displayed (e.g., "25").

Figure 8:
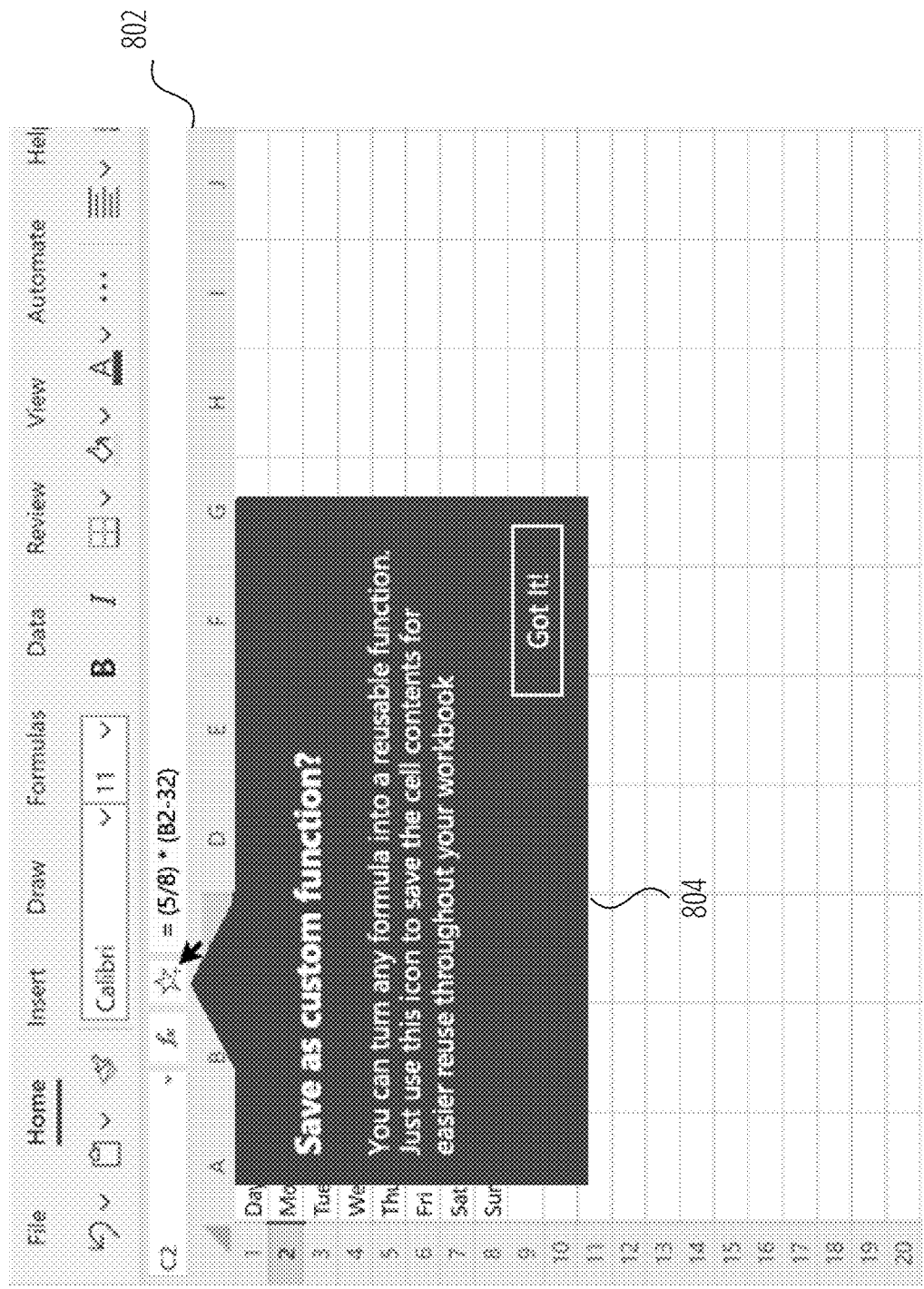
FIG. 8 is a screenshot illustrating an aspect of the subject matter in accordance with one example embodiment.

FIG. 8 is a screenshot 802 illustrating an aspect of the subject matter in accordance with one example embodiment. The screenshot 802 illustrates a custom function notification 804 as a result of detecting the custom formula 704 entered by the user.

Figure 9:
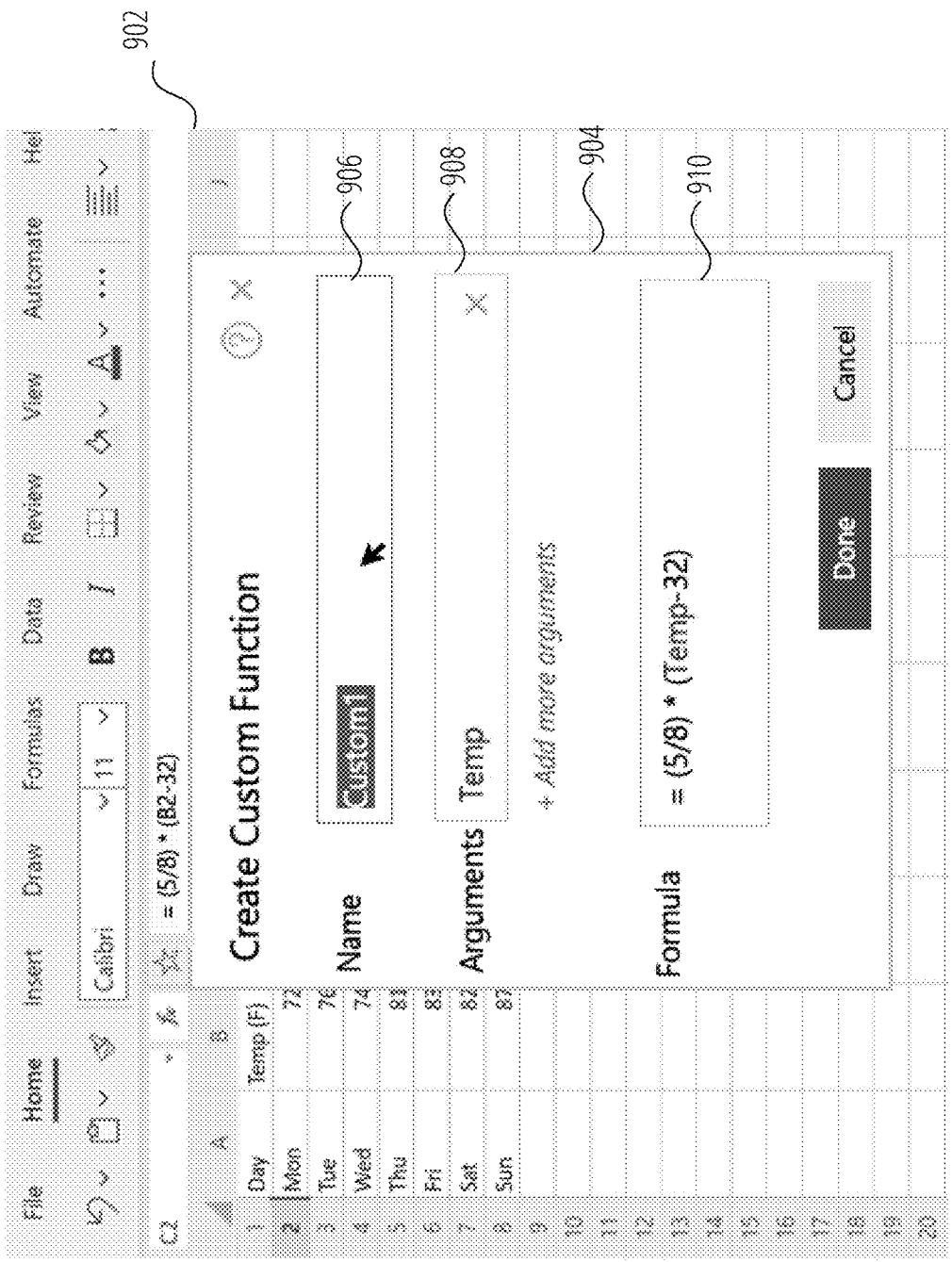
FIG. 9 is a screenshot illustrating an aspect of the subject matter in accordance with one example embodiment.

FIG. 9 is a screenshot 902 illustrating an aspect of the subject matter in accordance with one example embodiment. The screenshot 902 illustrates a custom function dialog box 904 displayed in response to detecting the formula 704. The custom function dialog box 904 includes a name entry box 906, an argument entry box 908, and a formula entry box 910.

Figure 10:
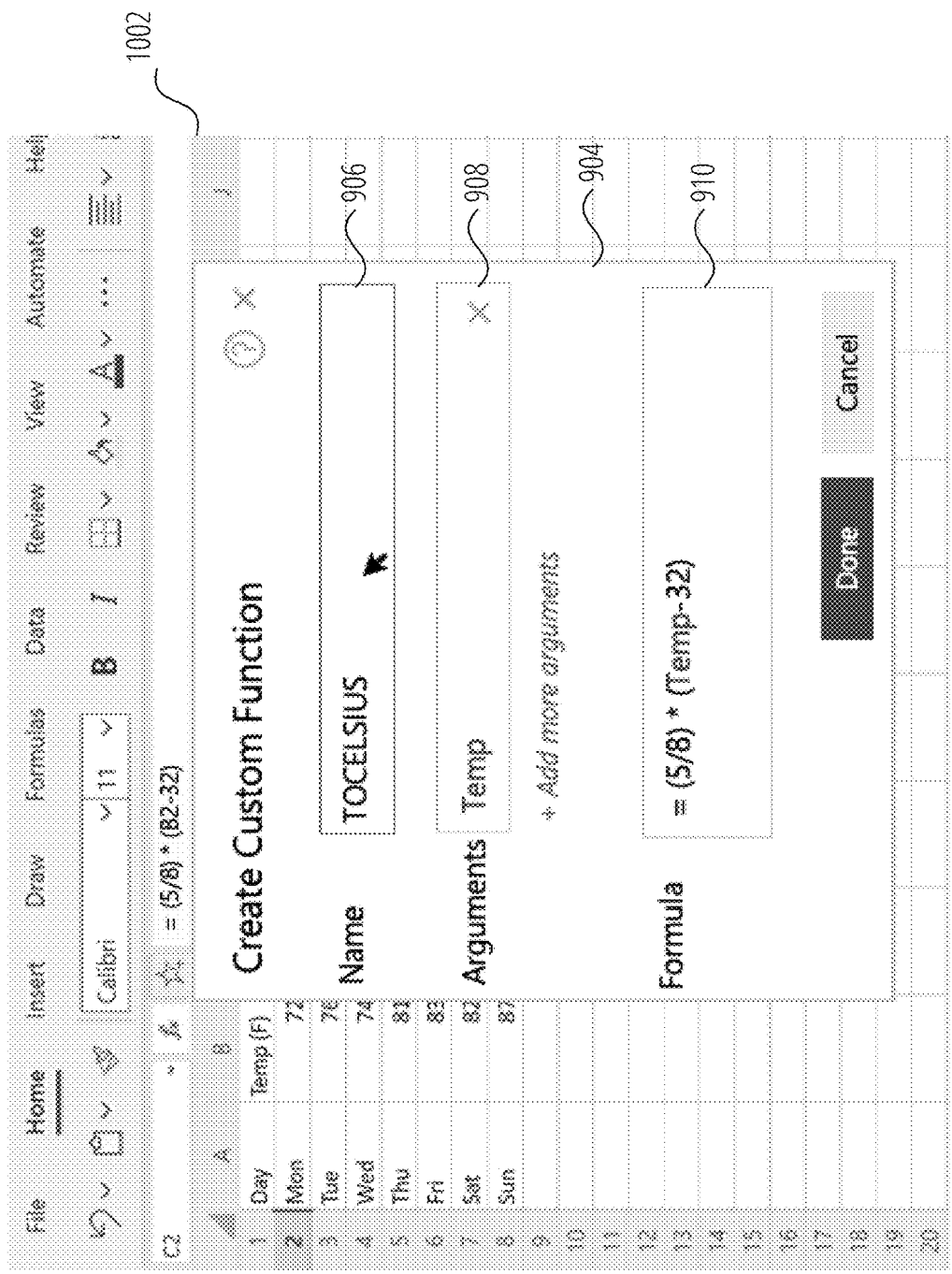
FIG. 10 is a screenshot illustrating an aspect of the subject matter in accordance with one example embodiment.

FIG. 10 is a screenshot 1002 illustrating an aspect of the subject matter in accordance with one example embodiment. The user 130 provides a custom label (e.g., "TOCELSIUS") for the name of the function in the name entry box 906.

Figure 11:
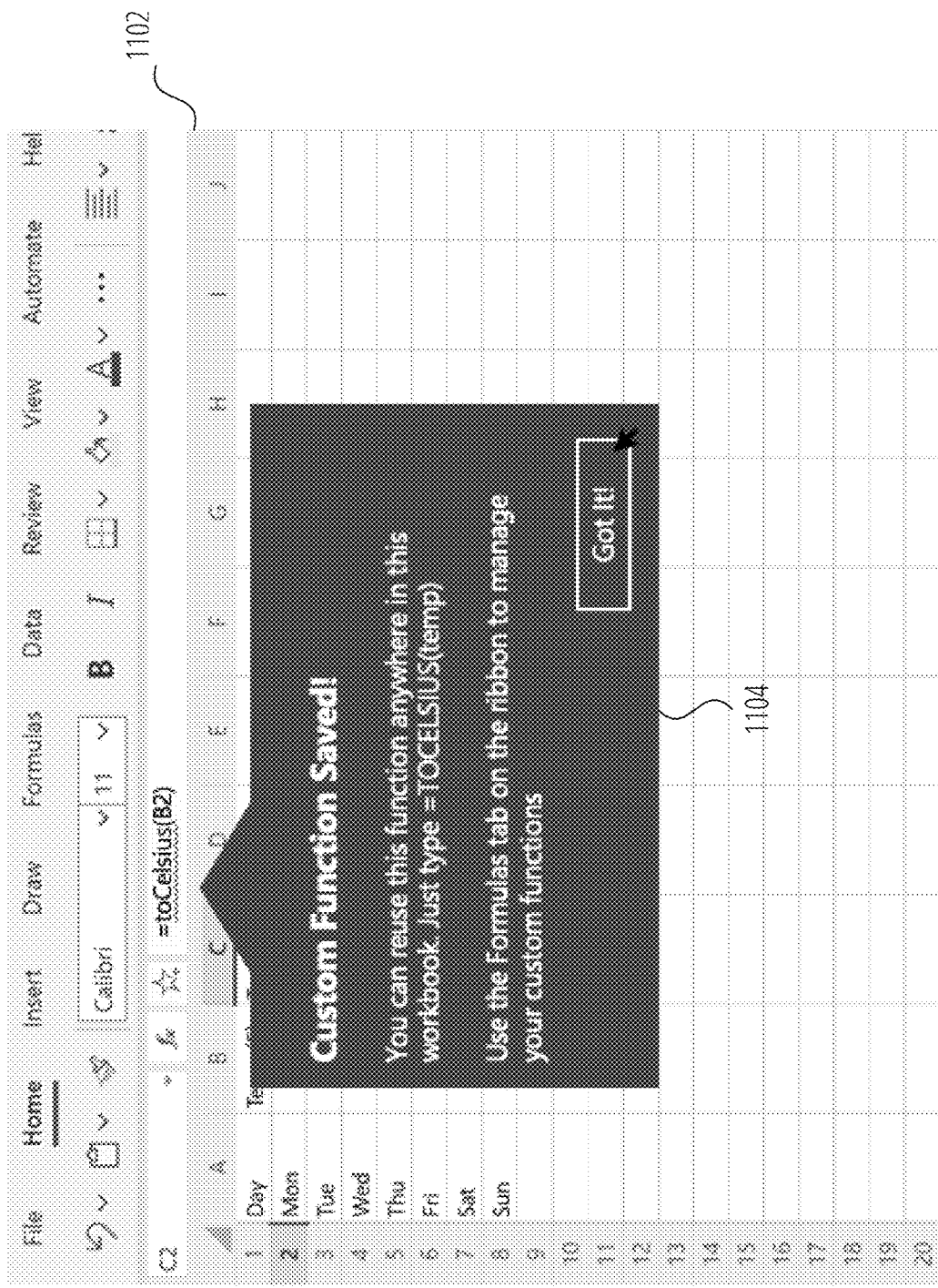
FIG. 11 is a screenshot illustrating an aspect of the subject matter in accordance with one example embodiment.

FIG. 11 is a screenshot 1102 illustrating an aspect of the subject matter in accordance with one example embodiment. The screenshot 1102 illustrates a custom function notification 1104 that indicates that the custom function has been saved.

Figure 12:
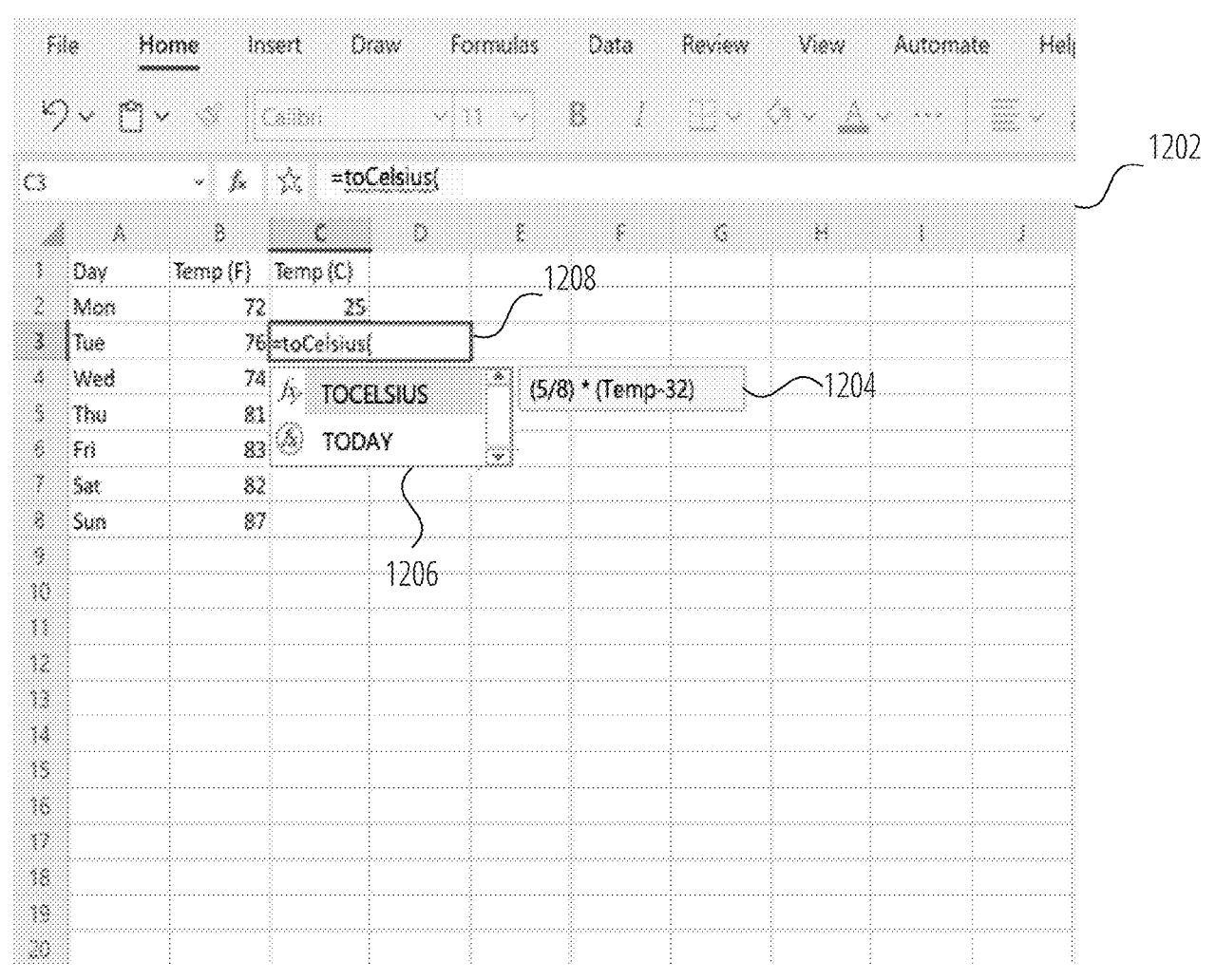

FIG. 12 is a screenshot 1202 illustrating an aspect of the subject matter in accordance with one example embodiment. The screenshot 1202 illustrates a reuse operation of the custom function. A list of custom formulas 1206 is displayed. The user 130 selects the "TOCELSIUS" function and the screenshot 1202 displays the corresponding custom formula logic 1204. The cell 1208 displays the selected custom function (e.g. "=tocelsius(").

Figure 13:
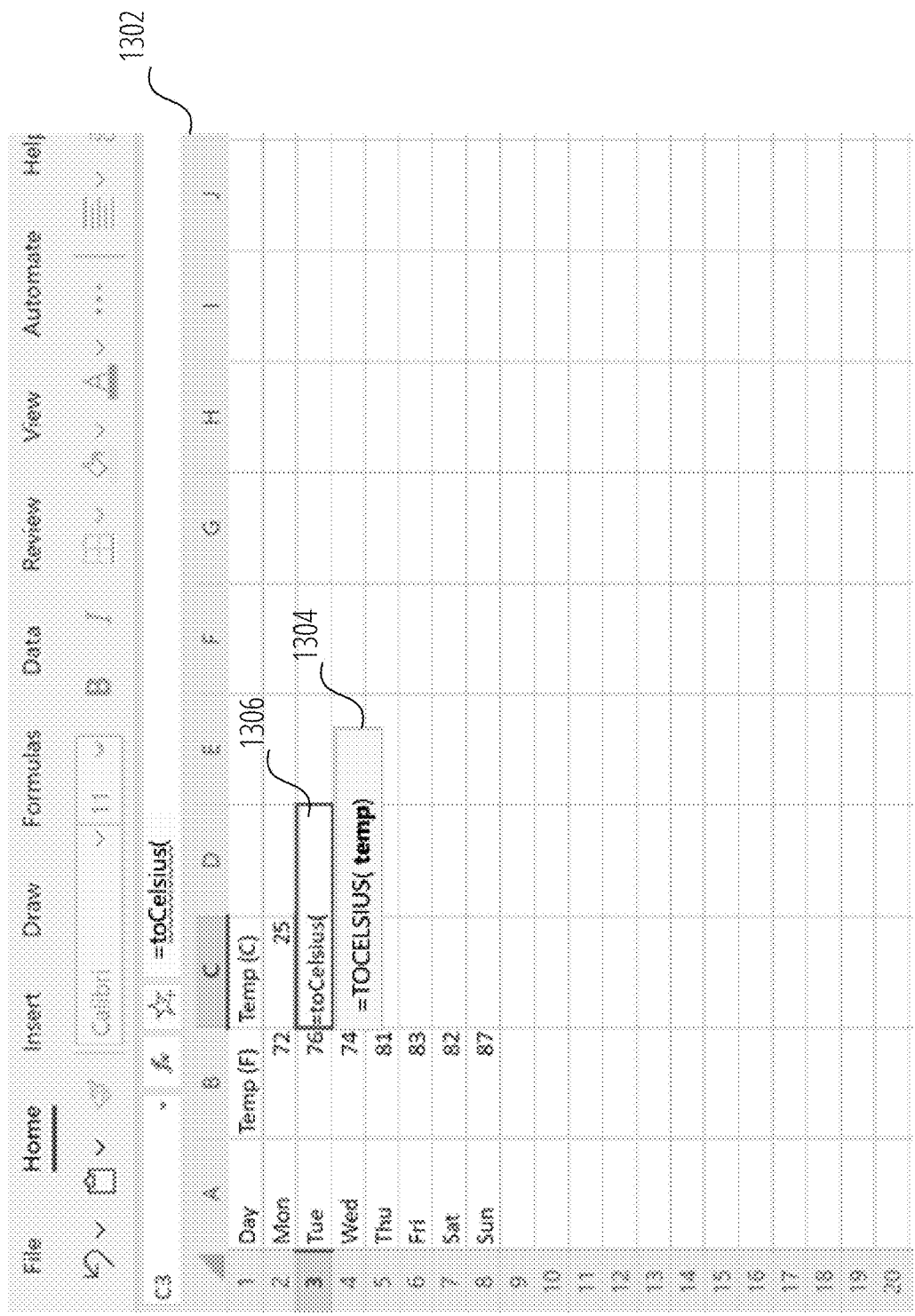
FIG. 13 is a screenshot illustrating an aspect of the subject matter in accordance with one example embodiment.

FIG. 13 is a screenshot 1302 illustrating an aspect of the subject matter in accordance with one example embodiment. The screenshot 1302 displays a formula parameter suggestion 1304 for the cell 1306.

Figure 14:
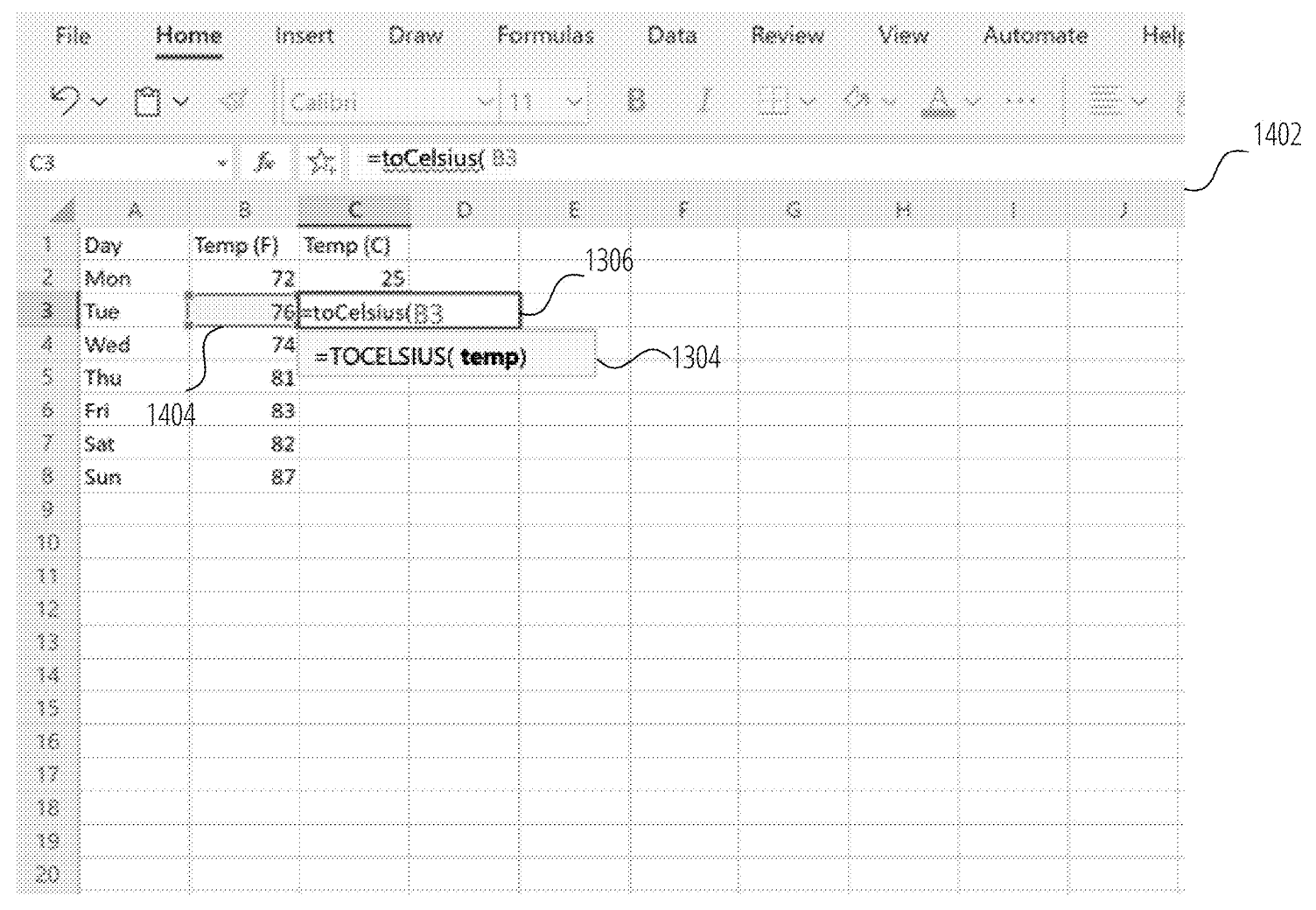

FIG. 14 is a screenshot 1402 illustrating an aspect of the subject matter in accordance with one example embodiment. The screenshot 1402 illustrates the variable (B3) for the custom function in cell 1306. The screenshot 1402 illustrates a variable cell indicator 1404 corresponding to the variable.

Figure 15:
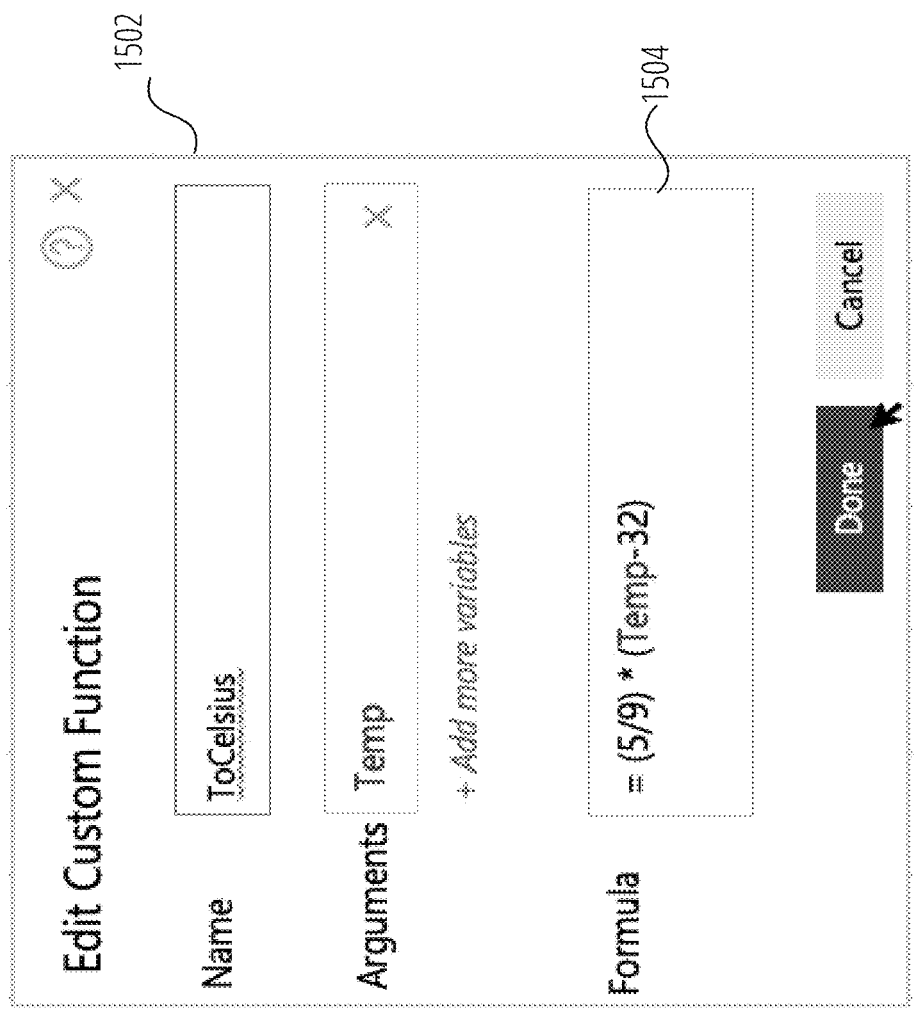
FIG. 15 is a screenshot of a dialog box illustrating an aspect of the subject matter in accordance with one example embodiment.

FIG. 15 is a screenshot of a custom function editor dialog box 1502 illustrating an aspect of the subject matter in accordance with one example embodiment. A user of the spreadsheet application 122 can edit a custom formula in the formula entry box 1504.

Figure 16:
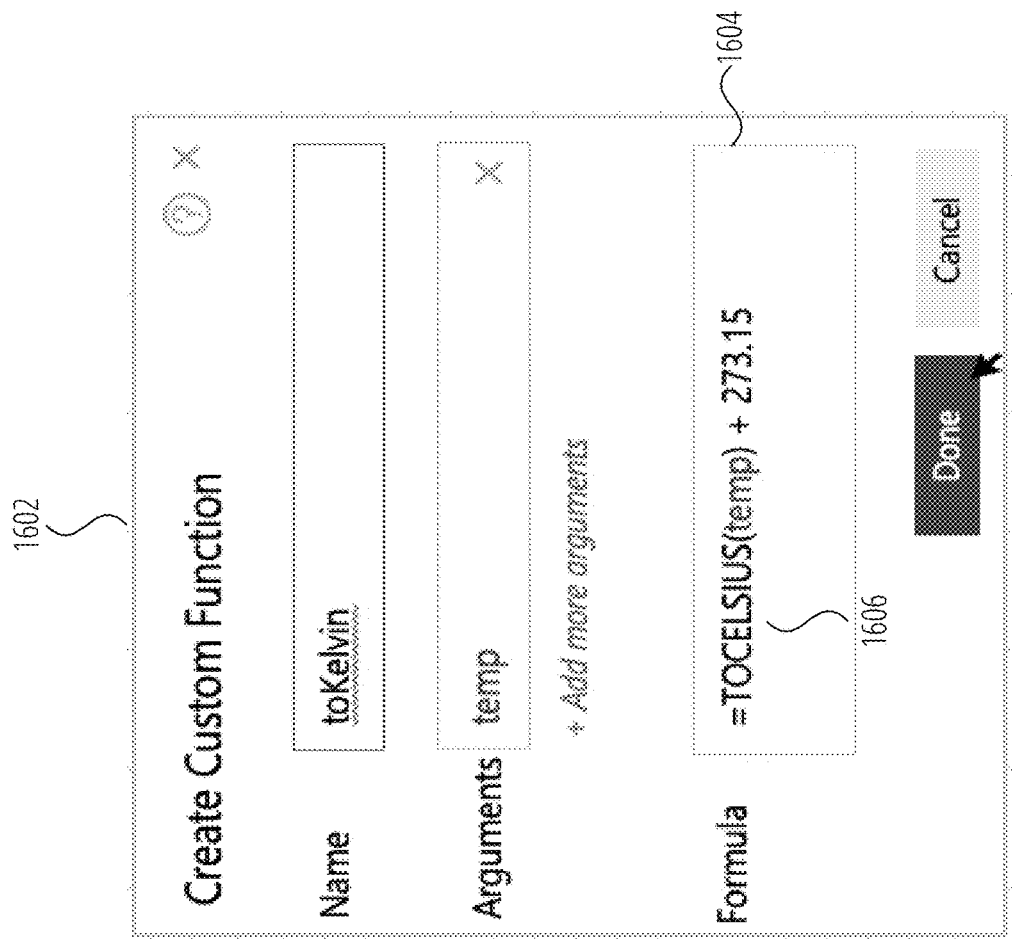
FIG. 16 is a screenshot of a dialog box illustrating an aspect of the subject matter in accordance with one example embodiment.

FIG. 16 is a screenshot of a custom function dialog box 1602 illustrating an aspect of the subject matter in accordance with one example embodiment. A user of the spreadsheet application 122 can nest another custom function 1606 in the formula entry box 1604.

Figure 17:
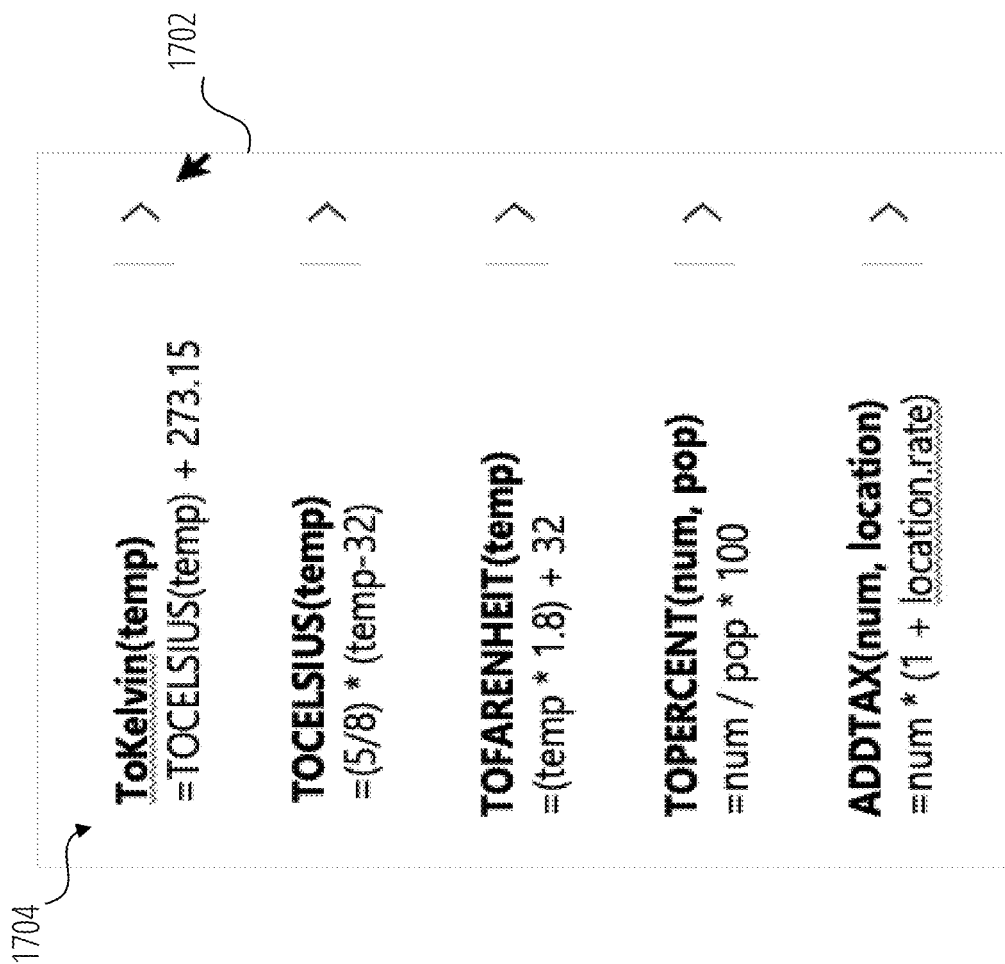
FIG. 17 is a screenshot of a custom function menu illustrating an aspect of the subject matter in accordance with one example embodiment.

FIG. 17 is a screenshot of a function library dialog box 1702 illustrating an aspect of the subject matter in accordance with one example embodiment. The function library dialog box 1702 displays a list of custom functions 1704 that can be reused in the spreadsheet document.

Figure 18:
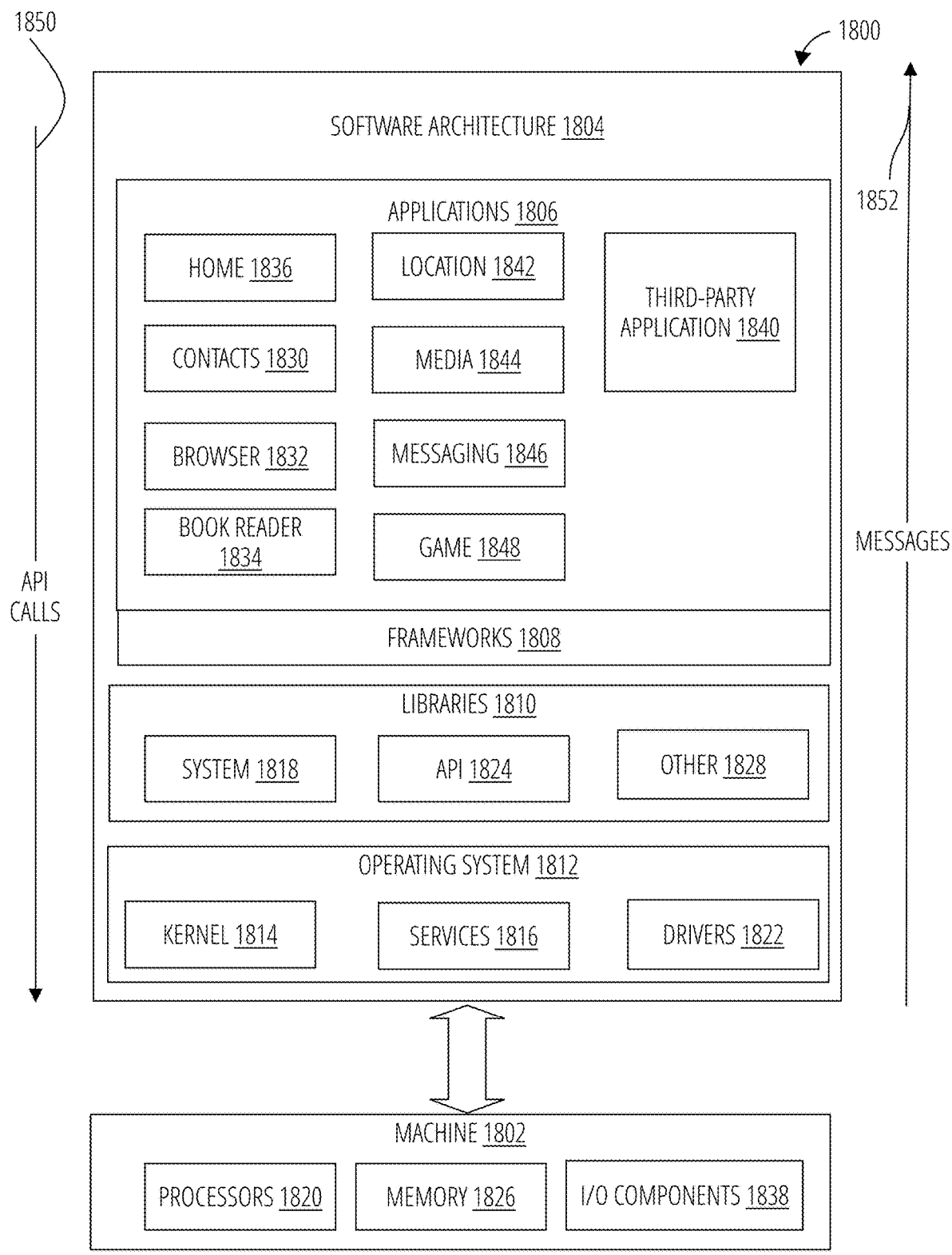
FIG. 18 is block diagram showing a software architecture within which the present disclosure may be implemented, according to an example embodiment.

FIG. 18 is a block diagram 1800 illustrating a software architecture 1804, which can be installed on any one or more of the devices described herein. The software architecture 1804 is supported by hardware such as a machine 1802 that includes Processors 1820, memory 1826, and I/O Components 1838. In this example, the software architecture 1804 can be conceptualized as a stack of layers, where each layer provides a particular functionality. The software architecture 1804 includes layers such as an operating system 1812, libraries 1810, frameworks 1808, and applications 1806. Operationally, the applications 1806 invoke API calls 1850 through the software stack and receive messages 1852 in response to the API calls 1850.

The operating system 1812 manages hardware resources and provides common services. The operating system 1812 includes, for example, a kernel 1814, services 1816, and drivers 1822. The kernel 1814 acts as an abstraction layer between the hardware and the other software layers. For example, the kernel 1814 provides memory management, Processor management (e.g., scheduling), Component management, networking, and security settings, among other functionality. The services 1816 can provide other common services for the other software layers. The drivers 1822 are responsible for controlling or interfacing with the underlying hardware. For instance, the drivers 1822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1810 provide a low-level common infrastructure used by the applications 1806. The libraries 1810 can include system libraries 1818 (e.g., C standard library) that provide functions such as memory allocation functions, string manipulation functions, mathematic functions, and the like. In addition, the libraries 1810 can include API libraries 1824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1810 can also include a wide variety of other libraries 1828 to provide many other APIs to the applications 1806.

The frameworks 1808 provide a high-level common infrastructure that is used by the applications 1806. For example, the frameworks 1808 provide various graphical user interface (GUI) functions, high-level resource management, and high-level location services. The frameworks 1808 can provide a broad spectrum of other APIs that can be used by the applications 1806, some of which may be specific to a particular operating system or platform.

In an example embodiment, the applications 1806 may include a home application 1836, a contacts application 1830, a browser application 1832, a book reader application 1834, a location application 1842, a media application 1844, a messaging application 1846, a game application 1848, and a broad assortment of other applications such as a third-party application 1840. The applications 1806 are programs that execute functions defined in the programs. Various programming languages can be employed to create one or more of the applications 1806, structured in a variety of manners, such as object-oriented programming languages (e.g., Objective-C, Java, or C++) or procedural programming languages (e.g., C or assembly language). In a specific example, the third-party application 1840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1840 can invoke the API calls 1850 provided by the operating system 1812 to facilitate functionality described herein.

Figure 19:
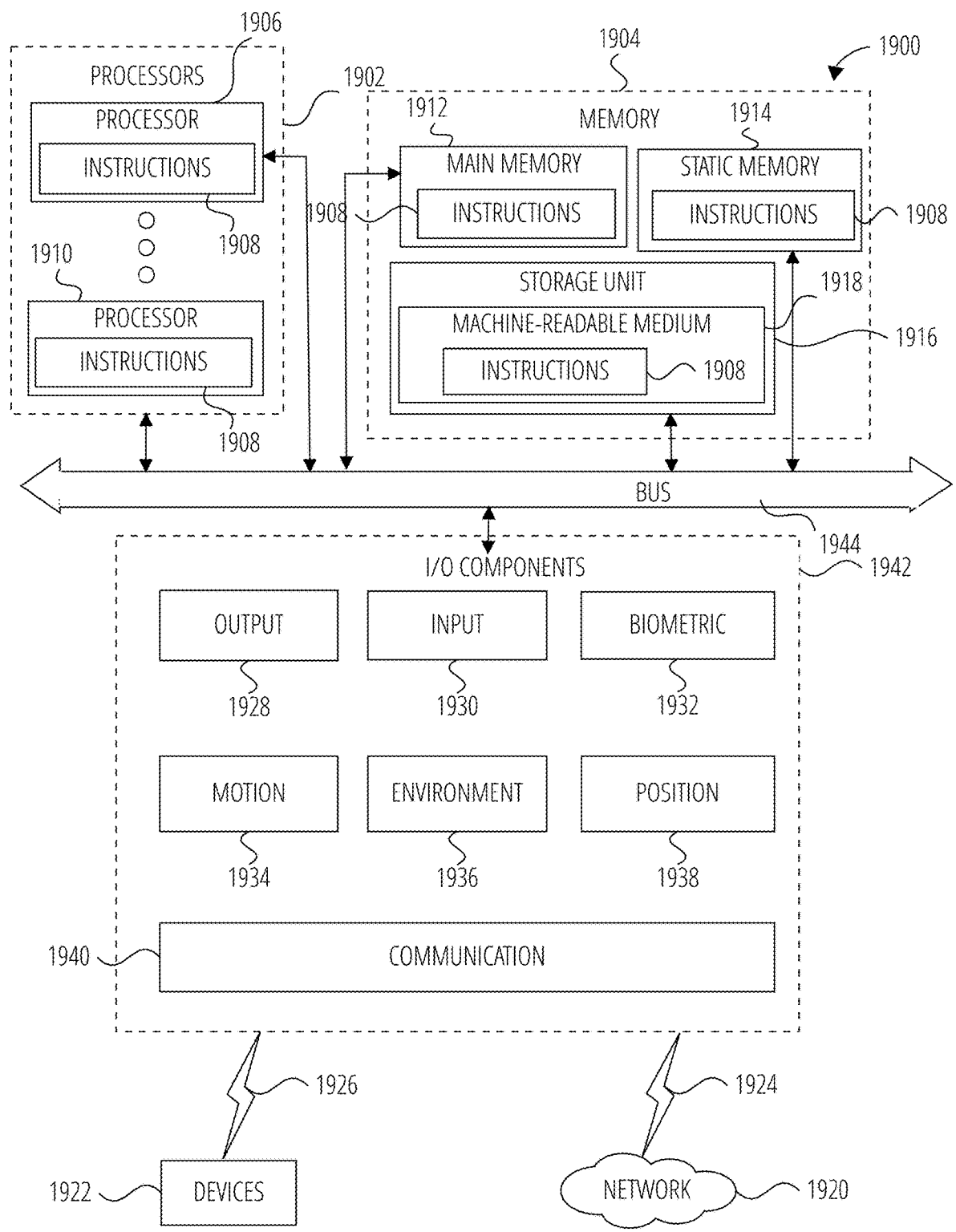
FIG. 19 is a diagrammatic representation of a machine in the form of a computer system within which a set of instructions may be executed for causing the machine to perform any one or more of the methodologies discussed herein, according to an example embodiment.

FIG. 19 is a diagrammatic representation of the machine 1900 within which instructions 1908 (e.g., software, a program, an application, an applet, an app, or other executable code) for causing the machine 1900 to perform any one or more of the methodologies discussed herein may be executed. For example, the instructions 1908 may cause the machine 1900 to execute any one or more of the methods described herein. The instructions 1908 transform the general, non-programmed machine 1900 into a particular machine 1900 programmed to carry out the described and illustrated functions in the manner described. The machine 1900 may operate as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1908, sequentially or otherwise, that specify actions to be taken by the machine 1900. Further, while only a single machine 1900 is illustrated, the term "machine" shall also be taken to include a collection of machines that individually or jointly execute the instructions 1908 to perform any one or more of the methodologies discussed herein.

The machine 1900 may include Processors 1902, memory 1904, and I/O Components 1942, which may be configured to communicate with each other via a bus 1944. In an example embodiment, the Processors 1902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1906 and a Processor 1910 that execute the instructions 1908. The term "Processor" is intended to include multi-core Processors that may comprise two or more independent Processors (sometimes referred to as "cores") that may execute instructions contemporaneously. Although FIG. 19 shows multiple Processors 1902, the machine 1900 may include a single Processor with a single core, a single Processor with multiple cores (e.g., a multi-core Processor), multiple Processors with a single core, multiple Processors with multiples cores, or any combination thereof.

The memory 1904 includes a main memory 1912, a static memory 1914, and a storage unit 1916, both accessible to the Processors 1902 via the bus 1944. The main memory 1904, the static memory 1914, and storage unit 1916 store the instructions 1908 embodying any one or more of the methodologies or functions described herein. The instructions 1908 may also reside, completely or partially, within the main memory 1912, within the static memory 1914, within machine-readable medium 1918 within the storage unit 1916, within at least one of the Processors 1902 (e.g., within the Processor's cache memory), or any suitable combination thereof, during execution thereof by the machine 1900.

The I/O Components 1942 may include a wide variety of Components to receive input, provide output, produce output, transmit information, exchange information, capture measurements, and so on. The specific I/O Components 1942 that are included in a particular machine will depend on the type of machine. For example, portable machines such as mobile phones may include a touch input device or other such input mechanisms, while a headless server machine will likely not include such a touch input device. It will be appreciated that the I/O Components 1942 may include many other Components that are not shown in FIG. 19. In various example embodiments, the I/O Components 1942 may include output Components 1928 and input Components 1930. The output Components 1928 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1930 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1942 may include biometric Components 1932, motion Components 1934, environmental Components 1936, or position Components 1938, among a wide array of other Components. For example, the biometric Components 1932 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1934 include acceleration sensor Components (e.g., accelerometer), gravitation sensor Components, rotation sensor Components (e.g., gyroscope), and so forth. The environmental Components 1936 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1938 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1942 further include communication Components 1940 operable to couple the machine 1900 to a network 1920 or devices 1922 via a coupling 1924 and a coupling 1926, respectively. For example, the communication Components 1940 may include a network interface Component or another suitable device to interface with the network 1920. In further examples, the communication Components 1940 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1922 may be another machine or any of a wide variety of peripheral devices (e.g., a peripheral device coupled via a USB).

Moreover, the communication Components 1940 may detect identifiers or include Components operable to detect identifiers. For example, the communication Components 1940 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1940, such as location via Internet Protocol (IP) geolocation, location via Wi-Fi® signal triangulation, location via detecting an NFC beacon signal that may indicate a particular location, and so forth.

The various memories (e.g., memory 1904, main memory 1912, static memory 1914, and/or memory of the Processors 1902) and/or storage unit 1916 may store one or more sets of instructions and data structures (e.g., software) embodying or used by any one or more of the methodologies or functions described herein. These instructions (e.g., the instructions 1908), when executed by Processors 1902, cause various operations to implement the disclosed embodiments.

The instructions 1908 may be transmitted or received over the network 1920, using a transmission medium, via a network interface device (e.g., a network interface Component included in the communication Components 1940) and using any one of a number of well-known transfer protocols (e.g., hypertext transfer protocol (HTTP)). Similarly, the instructions 1908 may be transmitted or received using a transmission medium via the coupling 1926 (e.g., a peer-to-peer coupling) to the devices 1922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

In one aspect, a computer-implemented method includes detecting a user-generated formula in a cell of a spreadsheet document, generating a graphical user interface that queries entries of a custom function based on the user-generated formula, forming the custom function by abstracting the user-generated formula to the custom function based on the entries, and storing the custom function in a function library of the spreadsheet document, the custom function being configured to apply the user-generated formula in a user-selected cell of the spreadsheet document.

The computer-implemented method may also include includes detecting an event indicating a reuse of the user-generated formula, where generating the graphical user interface is in response to detecting the event.

The computer-implemented method may also include includes identifying a variable in the user-generated formula, the variable being based on data in the spreadsheet document, where the user-generated formula indicates an operation on the variable.

The computer-implemented method may also include where the entries of the custom function include a label entry, an argument entry, and a formula entry, where the label entry identifies a name of the custom function, where the argument entry identifies a name of an argument that indicates a variable in the user-generated formula, and where the formula entry identifies the user-generated formula.

The computer-implemented method may also include further includes communicating the custom function and the spreadsheet document from a first user to a second user, modifying the custom function based on entries from the second user, and updating the custom function in the spreadsheet document of the first user based on the entries from the second user. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to detect a user-generated formula in a cell of a spreadsheet document, generate a graphical user interface that queries entries of a custom function based on the user-generated formula, form the custom function by abstracting the user-generated formula to the custom function based on the entries, and store the custom function in a function library of the spreadsheet document, the custom function being configured to apply the user-generated formula in a user-selected cell of the spreadsheet document.

The computing apparatus may also include includes detect an event indicating a reuse of the user-generated formula, where generating the graphical user interface is in response to detecting the event.

The computing apparatus may also include includes identify a variable in the user-generated formula, the variable being based on data in the spreadsheet document, where the user-generated formula indicates an operation on the variable.

The computing apparatus may also include where the entries of the custom function include a label entry, an argument entry, and a formula entry, where the label entry identifies a name of the custom function, where the argument entry identifies a name of an argument that indicates a variable in the user-generated formula, and where the formula entry identifies the user-generated formula. Other technical features may be readily apparent to one skilled in the art from the following figures, descriptions, and claims.

In one aspect, a non-transitory computer-readable storage medium, the computer-readable storage medium including instructions that when executed by a computer, cause the computer to detect a user-generated formula in a cell of a spreadsheet document, generate a graphical user interface that queries entries of a custom function based on the user-generated formula, form the custom function by abstracting the user-generated formula to the custom function based on the entries, and store the custom function in a function library of the spreadsheet document, the custom function being configured to apply the user-generated formula in a user-selected cell of the spreadsheet document.

The computer-implemented method may also include where the event is based on detecting a user selecting the cell, copying a content of the cell, and pasting the content of the cell in another cell.

The computer-implemented method may also include where the event is based on identifying a first cell includes the custom function, identifying a second cell adjacent to the custom function, detecting that the second cell is empty, and detecting that the second cell is selected by the user.

The computer-implemented method may also include further includes receiving the name of the custom function from a user of the spreadsheet document via the graphical user interface, receiving the name of the argument from the user of the spreadsheet document via the graphical user interface, and updating the user-generated formula by replacing the variable with the name of the argument.

The computer-implemented method may also include further includes identifying a header of a row or column corresponding to the variable, forming the name of the argument based on a label of the header, and updating the user-generated formula by replacing the variable with the name of the argument.

The computer-implemented method may also include where the variable represented by the name of the argument is based on a first cell corresponding to a second cell selected by the user, the first cell includes a value, the second cell includes the custom function operating on the value of the first cell.

The computing apparatus may also include where the event is based on detecting a user selecting the cell, copy a content of the cell, and pasting the content of the cell in another cell.

The computing apparatus may also include where the event is based on identify a first cell includes the custom function, identify a second cell adjacent to the custom function, detect that the second cell is empty, and detect that the second cell is selected by the user.

The computing apparatus may also include where the instructions further configure the apparatus to receive the name of the custom function from a user of the spreadsheet document via the graphical user interface, receive the name of the argument from the user of the spreadsheet document via the graphical user interface, and update the user-generated formula by replacing the variable with the name of the argument.

The computing apparatus may also include where the instructions further configure the apparatus to identify a header of a row or column corresponding to the variable, form the name of the argument based on a label of the header, and update the user-generated formula by replacing the variable with the name of the argument.

The computing apparatus may also include where the variable represented by the name of the argument is based on a first cell corresponding to a second cell selected by the user, the first cell includes a value, the second cell includes the custom function operate on the value of the first cell. Other technical features may be readily apparent to one skilled in the art from the following figures, descriptions, and claims.

What is claimed is:

1. A computer-implemented method comprising:
   detecting a user-generated formula in a cell of a spreadsheet document;
   identifying an argument that is not specified in the user-generated formula, the argument indicating a variable name from the spreadsheet document, the user-generated formula indicating an operation on a value of the variable name without identifying the variable name;
   generating a graphical user interface that queries entries of a custom function based on the user-generated formula;
   forming the custom function by abstracting the user-generated formula to the custom function based on the entries and the argument; and
   storing the custom function in a function library of the spreadsheet document, the custom function being configured to apply the user-generated formula in a user-selected cell of the spreadsheet document.

2. The computer-implemented method of claim 1, comprising:
   detecting an event indicating a reuse of the user-generated formula,
   wherein generating the graphical user interface is in response to detecting the event.

3. The computer-implemented method of claim 2, wherein the event is based on detecting a user selecting the cell, copying a content of the cell, and pasting the content of the cell in another cell.

4. The computer-implemented method of claim 2, wherein the event is based on:
   identifying a first cell comprising the custom function;
   identifying a second cell adjacent to the custom function;
   detecting that the second cell is empty; and
   detecting that the second cell is selected by the user.

5. The computer-implemented method of claim 1, comprising:
   populating an argument entry in the graphical user interface with the variable name.

6. The computer-implemented method of claim 1, wherein the entries of the custom function comprises a label entry, an argument entry, and a formula entry,
   wherein the label entry identifies a name of the custom function,
   wherein the argument entry identifies a name of an argument that indicates a variable in the user-generated formula, and
   wherein the formula entry identifies the user-generated formula.

7. The computer-implemented method of claim 6, further comprising:
   receiving the name of the custom function from a user of the spreadsheet document via the graphical user interface;
   receiving the name of the argument from the user of the spreadsheet document via the graphical user interface; and
   updating the user-generated formula by replacing the variable with the name of the argument.

8. The computer-implemented method of claim 6, further comprising:
   identifying a header of a row or column corresponding to the variable;
   forming the name of the argument based on a label of the header; and
   updating the user-generated formula by replacing the variable with the name of the argument.

9. The computer-implemented method of claim 6, wherein the variable represented by the name of the argument is based on a first cell corresponding to a second cell selected by the user, the first cell comprising a value, the second cell comprising the custom function operating on the value of the first cell.

10. The computer-implemented method of claim 1, further comprising:
    communicating the custom function and the spreadsheet document from a first user to a second user;
    modifying the custom function based on entries from the second user; and updating the custom function in the spreadsheet document of the first user based on the entries from the second user.

11. A computing apparatus comprising:
a processor; and
a memory storing instructions that, when executed by the processor, configure the apparatus to:
detect a user-generated formula in a cell of a spreadsheet document;
identify an argument that is not specified in the user-generated formula, the argument indicating a variable name from the spreadsheet document, the user-generated formula indicating an operation on a value of the variable name without identifying the variable name;
generate a graphical user interface that queries entries of a custom function based on the user-generated formula;
form the custom function by abstracting the user-generated formula to the custom function based on the entries and the argument; and
store the custom function in a function library of the spreadsheet document, the custom function being configured to apply the user-generated formula in a user-selected cell of the spreadsheet document.

12. The computing apparatus of claim 11, comprising:
detect an event indicating a reuse of the user-generated formula,
wherein generating the graphical user interface is in response to detecting the event.

13. The computing apparatus of claim 12, wherein the event is based on detecting a user selecting the cell, copy a content of the cell, and pasting the content of the cell in another cell.

14. The computing apparatus of claim 12, wherein the event is based on:
identify a first cell comprising the custom function;
identify a second cell adjacent to the custom function;
detect that the second cell is empty; and
detect that the second cell is selected by the user.

15. The computing apparatus of claim 11, wherein the instructions further configure the apparatus to:
populating an argument entry in the graphical user interface with the variable name.

16. The computing apparatus of claim 11, wherein h entries of the custom function comprise a label entry, an argument entry, and a formula entry,
wherein the label entry identifies a name of the custom function,
wherein the argument entry identifies a name of an argument that indicates a variable in the user-generated formula, and
wherein the formula entry identifies the user-generated formula.

17. The computing apparatus of claim 16, wherein the instructions further configure the apparatus to:
receive the name of the custom function from a user of the spreadsheet document via the graphical user interface;
receive the name of the argument from the user of the spreadsheet document via the graphical user interface; and
update the user-generated formula by replacing the variable with the name of the argument.

18. The computing apparatus of claim 16, wherein the instructions further configure the apparatus to:
identify a header of a row or column corresponding to the variable;
form the name of the argument based on a label of the header; and
update the user-generated formula by replacing the variable with the name of the argument.

19. The computing apparatus of claim 16, wherein the variable represented by the name of the argument is based on a first cell corresponding to a second cell selected by the user, the first cell comprising a value, the second cell comprising the custom function operate on the value of the first cell.

20. A non-transitory computer-readable storage medium, the computer-readable storage medium including instructions that when executed by a computer, cause the computer to:
detect a user-generated formula in a cell of a spreadsheet document;
identify an argument that is not specified in the user-generated formula, the argument indicating a variable name from the spreadsheet document, the user-generated formula indicating an operation on a value of the variable name without identifying the variable name;
generate a graphical user interface that queries entries of a custom function based on the user-generated formula;
form the custom function by abstracting the user-generated formula to the custom function based on the entries and the argument; and
store the custom function in a function library of the spreadsheet document, the custom function being configured to apply the user-generated formula in a user-selected cell of the spreadsheet document.

* * * * *